United States Patent [19]
Das et al.

[11] Patent Number: 5,586,134
[45] Date of Patent: Dec. 17, 1996

[54] EXCIMER LASER

[75] Inventors: Palash P. Das, Vista; Donald G. Larson, San Diego, both of Calif.

[73] Assignee: Cymer Laser Technologies, San Diego, Calif.

[21] Appl. No.: 322,309

[22] Filed: Oct. 12, 1994

Related U.S. Application Data

[62] Division of Ser. No. 975,652, Nov. 13, 1992, Pat. No. 5,377,215.
[51] Int. Cl.$^6$ ........................... H01S 3/00
[52] U.S. Cl. ........................... 372/38; 372/55
[58] Field of Search ........................... 372/55, 38

[56] References Cited

U.S. PATENT DOCUMENTS 5,315,611  5/1994  Ball et al. ........................... 372/38

Primary Examiner—Rodney B. Bovernick
Assistant Examiner—Robert E. Wise
Attorney, Agent, or Firm—David J. Power; David G. Beck

[57] ABSTRACT

A housing in a laser system encloses a cathode and a displaced anode and gases ionizable and reactive chemically when a voltage pulse produces a cathode-anode electrical discharge. Moving air cools the components (capacitors, thyratron and triggering circuitry) for producing the voltage pulses. The laser gas temperature is continuously regulated at a particular value whether or not there is an electrical discharge. The concentration of one of the gases in the chamber is regulated to values alternately on opposite sides of an optimal value to provide an optimal energy in each chemical reaction of the gases. The gases are recirculated as by a fan driven on a shaft by a pair of motors and are filtered during such recirculation. The shaft speed is regulated at a particular value and the motor currents are regulated to be equal. Any ozone formed in a compartment holding the high voltage terminals is purged by passing a neutral gas (nitrogen) through the compartment to the atmosphere. The neutral gas is passed into the housing through a hose which also holds a high voltage wire in insulated relationship to other electrical components. A collar arrangement at one wire end provides for the introduction of voltage from the collar to the anode of the thyratron with the hose coupled to the housing and grounds the collar with the wire decoupled from the housing. The different high voltage components are sequentially tested for their operability by a system and method unique to this invention.

18 Claims, 13 Drawing Sheets

SUB-PROGRAM PERTURB

LASER DIAGNOSTICS

EXCIMER LASER

This is a division of application Ser. No. 07/975,652 filed Nov. 13, 1992, now U.S. Pat. No. 5,377,215.

This invention relates to lasers and more particularly to lasers such as excimer lasers which operate more efficiently than lasers of the prior art. The invention particularly relates to moderate power lasers such as excimer lasers.

Lasers have many uses. For example, lasers are used to repair torn retinas in eyes and to perform other eye operations such as to reshape the cornea of the eye for correcting for defects in vision. Lasers are also used for other functions in the human body such as to remove plaques in heart arteries. Lasers are also used to cut holes at precise positions in semiconductor wafers.

In some gas discharge lasers, a cathode and an anode are disposed in spaced relationship in a housing. When a voltage pulse is applied between the cathode and the anode, an electrical discharge is produced between the cathode and the anode. The electrical discharge causes gases in the housing to become ionized and to react chemically upon ionization. For example, krypton and fluorine react chemically to produce krypton fluoride (KrF). The chemical reaction produces radiation energy at a particular frequency.

Although lasers now in use have an ever expanding number of functions in a progressively increasing number of fields, such lasers have certain inherent limitations. This is particularly true of lasers which provide moderate to large amounts of power. For example, the following limitations exist in lasers, particularly in those providing moderate or large amounts of power:

1. High voltage components such as capacitors, thyratrons and boards for providing a controlled triggering of the thyratrons are included in the lasers to produce a high voltage (e.g. 20 Kilovolts) which is introduced to the cathode to initiate the production of the voltage pulses between the cathode and the anode. Such components are not adequately cooled in prior art lasers.

2. The gases in the housing are continuously passed from the housing, filtered and then re-introduced into the housing. Attempts have been made to regulate the temperature of the gases in the housing. Such attempts have not been entirely successful. One reason has been that the temperature of the gases has been regulated only when the voltage pulses have been produced. Another reason has been that the housing has not been uniform. This has prevented the temperature of the gases from being stabilized at an optimal value to enhance the ionization and chemical reaction of the gases in the housing.

3. It would be desirable to maintain the output energy from the laser at an optimal level. This in turn would cause the radiation energy in each pulse to be at an optimum level and the efficiency of the laser to be at an optimal level. This has not occurred in the prior art.

4. The terminals for introducing the high voltage to the cathode are disposed in a separate compartment. The high voltage in the compartment produces a corona discharge and the corona discharge in turn produces ozone. The ozone is deleterious to the components, particularly the insulating members, in the compartment. It would accordingly be desirable to prevent the ozone from having any deleterious effects.

5. The motor and the fan for recirculating the gases from the housing through the filter and back to the housing are quite large. It would be desirable to provide motors of reduced size but still provide an optimal efficiency in their operation.

6. The introduction of the high voltage into the laser and to the anode in the laser has to be done carefully to avoid problems with the high voltage. Furthermore, when the voltage lines are not coupled into the housing and are separated from the housing, assurance has to be provided that the high voltage lines are grounded.

7. When there has been a decrease in the output energy of a laser, random—not systematic—tests have been performed on the laser. Since these tests have been random and not systematic, a determination of the cause of the failure to introduce high voltage pulses to the cathode has generally been made only after much trial and tribulation. Furthermore, specially trained personnel have been required to make such tests.

In one embodiment of the invention for use with a moderate or high power laser such as an excimer laser, a housing encloses a cathode and a displaced anode and gases ionizable and reactive chemically when a voltage pulse produces an electrical discharge between the cathode and the anode. Moving air cools the components (capacitors, thyratron and triggering circuitry) for producing the voltage pulses. The temperature of the laser gases is continuously regulated at a particular value and is additionally regulated upon the production of each electrical discharge voltage pulse.

The concentration of one of the gases in the chamber is regulated to values alternately on opposite sides of an optimal value to provide an optimal energy in each chemical reaction of the gases. The gases are recirculated as by fans driven on a shaft by a pair of motors and are filtered during such recirculation. The shaft speed is regulated at a particular value and the motor currents are regulated to be equal.

Any ozone formed in a compartment holding the high voltage terminals is purged by passing a neutral gas (nitrogen) through the compartment to the atmosphere. The neutral gas is passed into the housing through a hose which also holds a high voltage wire in insulated relationship to other electrical components. A collar arrangement at one wire end provides for the introduction of voltage from the collar to the anode of the thyratron with the hose coupled to the housing and grounds the collar with the wire decoupled from the housing.

The different high voltage components are sequentially tested for their operability by a system and method unique to this invention. A microprocessor based controller interrogates the several suitably located diagnostics in the laser in the event of a less than expected laser energy pulse. The malfunctioning components can then be immediately identified.

In one embodiment of the invention, a laser generally indicated at 10 may have a construction generally corresponding to that disclosed in Pat. No. 4,959,840 issued on Sep. 25, 1990, to Robert P. Akins, Donald G. Larson, Uday K. Sengupta and Richard L. Sandstrom for a "Compact Excimer Laser Including an Electrode Mounted in Insulating Relationship to Wall of the Laser" and assigned of record to the assignee of record of this application. Pat. No. 4,959,840 is intended to be used to complete any disclosure if such should be necessary.

Figure 1:
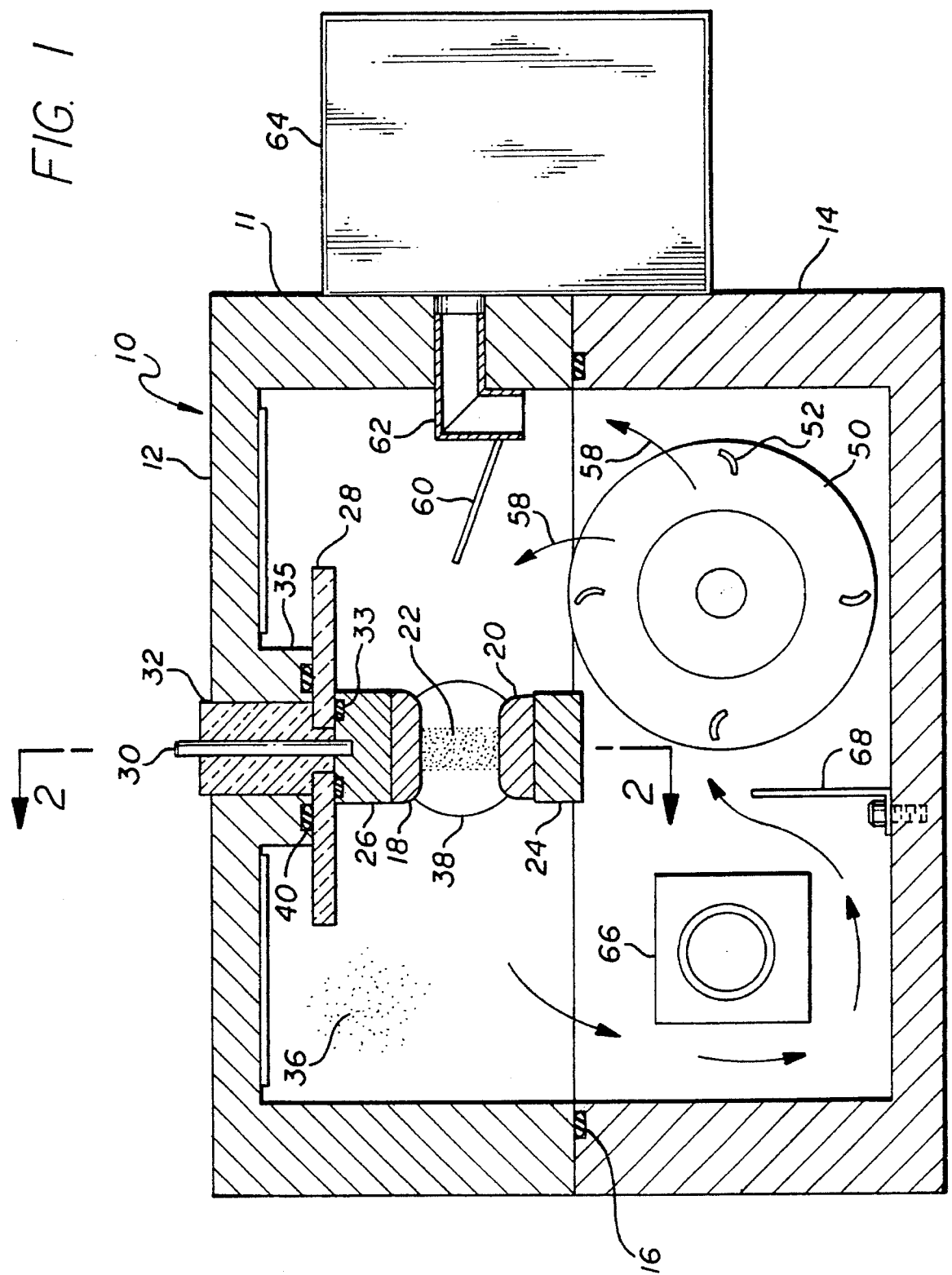
FIG. 1 is a schematic end sectional view showing certain components in a laser constituting one embodiment of the invention and particularly showing a housing holding a cathode and an anode and gases in the housing.
Figures 2, 4:
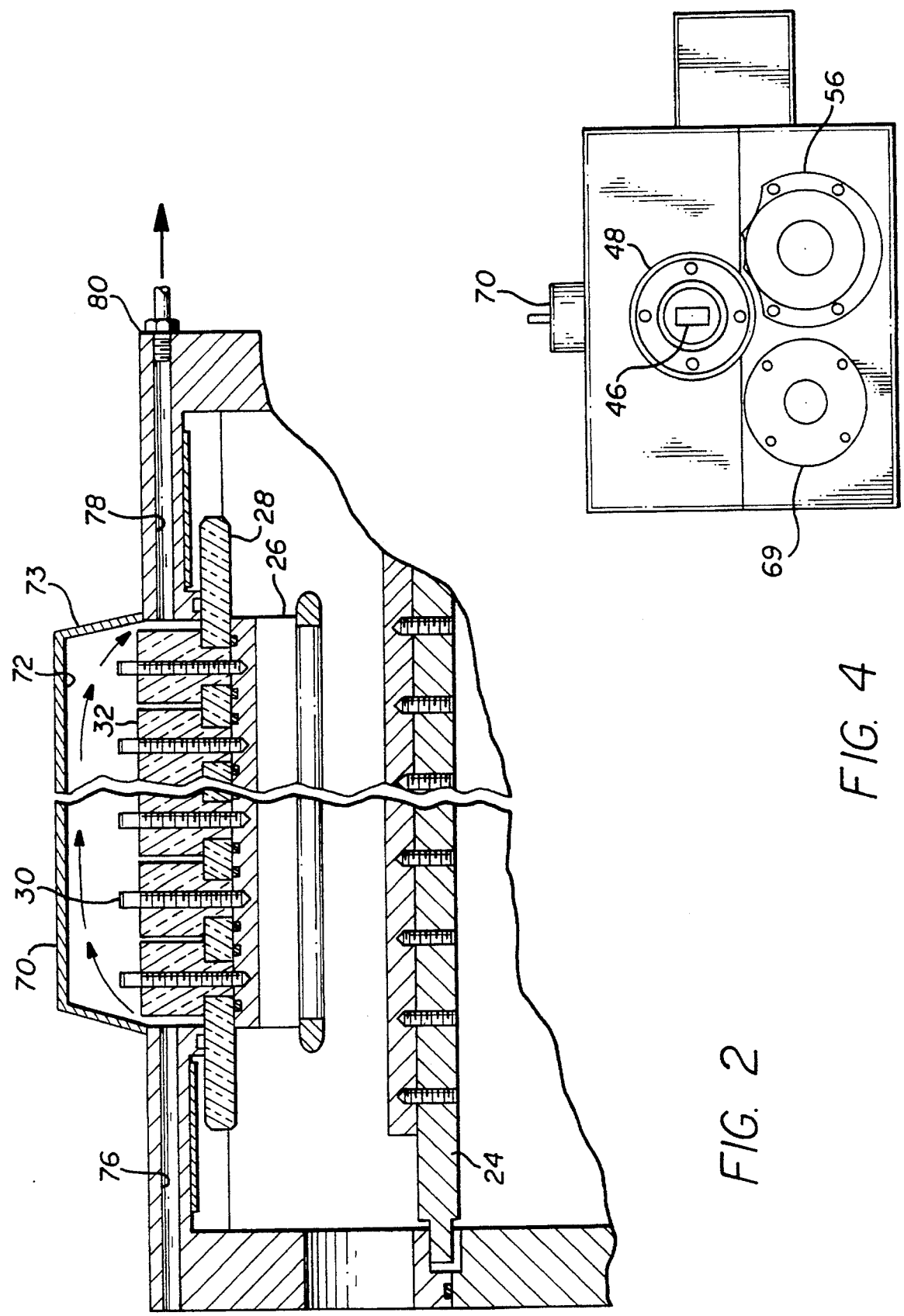
FIG. 2 is an enlarged fragmentary sectional side elevational view taken substantially on the line 2—2 of FIG. 1 and shows a compartment and components in the compartment for introducing a high voltage to the cathode.
FIG. 4 is an end elevational view of the laser from an external position and shows a window for passing energy radiation produced in the laser and further shows apparatus for recirculating and filtering gases in the housing.

The laser 10 includes a housing 11 (FIG. 1) formed from a pair of half members 12 and 14. The half members 12 and 14 are coupled and sealed as by an "O" ring seal 16 which extends around the perimeter of the housing 11. FIG. 1 shows the interior of the laser 10 from an end elevational view and FIG. 2 illustrates the top portion of the laser from a side elevational view.

A cathode 18 and a grounded anode 20 (FIGS. 1 and 2) are disposed in spaced relationship within the housing 11. The cathode 18 and the anode 20 may be formed from suitable high purity metals so as to minimize the erosion of the metals and to avoid contaminating the laser gases with erosion products which may be formed. An electrical discharge area schematically illustrated at 22 is disposed between the cathode 18 and the anode 20. The electrical discharge in the area 22 is produced by a high voltage pulse such as in the order of twenty Kilovolts (20 kV) impressed on the cathode 18.

A base member 24 (FIGS. 1 and 2) made from a suitable conducting material supports the anode 20. A conductive member 26 contacts the cathode 18. The conductive member 26 is disposed adjacent a main insulator plate 28. The main insulator plate 28 separates and insulates threaded metal rods 30 (FIG. 2) from one another. The threaded rods 30 engage the conductive member 26 to introduce the high voltage to the cathode 18. The threaded rods 30 extend through insulating bushings 32 made from a suitable material such as a ceramic.

The upper housing member 12 includes downwardly extending wall portions 35 so that the main insulator plate 28 is spaced from the upper wall of the housing member 12. "O" rings 33 (FIG. 1) are disposed in recesses in the conductive member 26 on one side of the main insulator plate 28 and "O" rings 35 are disposed in recesses on the other side of the main insulator plate 28 so that the central portion of the main insulator plate 28 is held in compression between the "O" rings. The main insulator plate 28 electrically insulates the cathode 18 from the walls of the housing member 11 and thereby insures that a proper electrical discharge occurs between the cathode 18 and the anode 20.

When a high voltage is applied to the cathode 18 through the connector rods 30 and the conductive member 26, an electrical discharge is produced in the region 22 between the cathode and the anode 20. This electrical discharge ionizes gases 36 in the vicinity of the area 22 and causes these gases to react chemically. For example, the gases 36 may be Krypton (Kr) and fluorine ($F_2$). The Krypton and the fluorine react chemically to produce Krypton fluoride (KrF). The gases in the vicinity of the area 22 are located primarily in a region defined schematically as 38 in FIG. 1.

The formation of the Krypton fluoride produces energy radiation in a very narrow band of wavelengths such as in the excimer range. This light is directed to an optical element such as a window 46 (FIG. 4) at one end (or to a mirror adjacent the window) and to a corresponding optical element at the other end. The energy radiation is reflected between the opposite optical elements and is reinforced in each reflection. A portion of the energy radiation moving in each cycle between the opposite optical elements passes through one of the optical elements such as the optical element 46. The energy radiation passing through the optical element 46 such as the window has a narrow band of frequencies and has a high intensity and a narrow width. The optical element 46 and the optical element at the other end may be made from a suitable material such as a magnesium fluoride which is transparent in deep ultraviolet light. The optical element 46 may be included in a window structure 48 shown in FIG. 4.

The gases 36 in the housing 11 are withdrawn from the housing and are recirculated in a closed loop and introduced back into the housing. Preferably this recirculation is provided through a number of cycles during the period between the introduction of successive voltage pulses to the cathode 18. During such recirculations, debris is removed from the gases 36 as by filtering the gases. The debris may be produced as a result of the electrical discharges between the cathode 18 and the anode 20.

The recirculation of the gases 36 may be provided by a fan 50 (FIG. 1) having blades 52. A cap 56 in FIG. 4 provides a support for the fan 50 and the motors driving the fan. As shown by arrows 58 in FIG. 1, the fan 50 drives the gases 36 upwardly in FIG. 1 through the electrical discharge area 22. This movement is facilitated by a vane 60. A gas scoop 62 provides for a portion of the gases 36 to be siphoned from the housing 11 for filtering by a filter 64. The filter 64 may be constructed as shown and disclosed in Pat. No. 4,959,840. The filter 64 removes the debris (foreign matter) or contaminants from the gases 36.

After filtering, the gases 36 are returned into the housing 11. A portion of the clean gases from the filter 64 may be moved past the optical element 46 and the optical element at the other end to clean the optical elements. Apparatus for cleaning the optical element 46 and the other optical element is fully disclosed in Pat. No. 4,959,840. Alternatively, the apparatus for cleaning the window may be as disclosed and claimed in application Serial No. filed on by Robert P. Akins for "Apparatus, and Method of, Maintaining a Clean Window in a Laser" and assigned of record to the assignee of record of this application.

The gases 36 are heated considerably by the electrical discharge between the cathode 18 and the anode 20. It is desirable, however, that the gases 36 should not remain heated. The gases remaining in the housing 11 are accordingly cooled by a water cooled heat exchanger 66 in FIG. 1. The cooled gases are forced upwardly as by a vane 68. These gases accordingly move to the fan 50 for circulation into the electric discharge area 22. An end cap 69 in FIG. 4 may be provided to support the heat exchanger 66.

Walls 70 extend upwardly from the housing member 12 to define a compartment 72 (FIG. 2) in communication with the interior of the housing 11. The conductor rods 30 and the insulating bushings 32 are disposed in the compartment 72. Since the conductor rods 30 receive a high voltage in the order of approximately twenty thousand volts (20 kV), a corona discharge tends to occur in the compartment 72. This corona discharge tends to produce ozone which in turn produces a deterioration in the insulating properties of the bushings 32 and the main insulator plate 28. The performance of the laser 10 is affected by this deterioration in the insulating properties of the bushings 32 and the main insulator plate 28.

Figure 3:
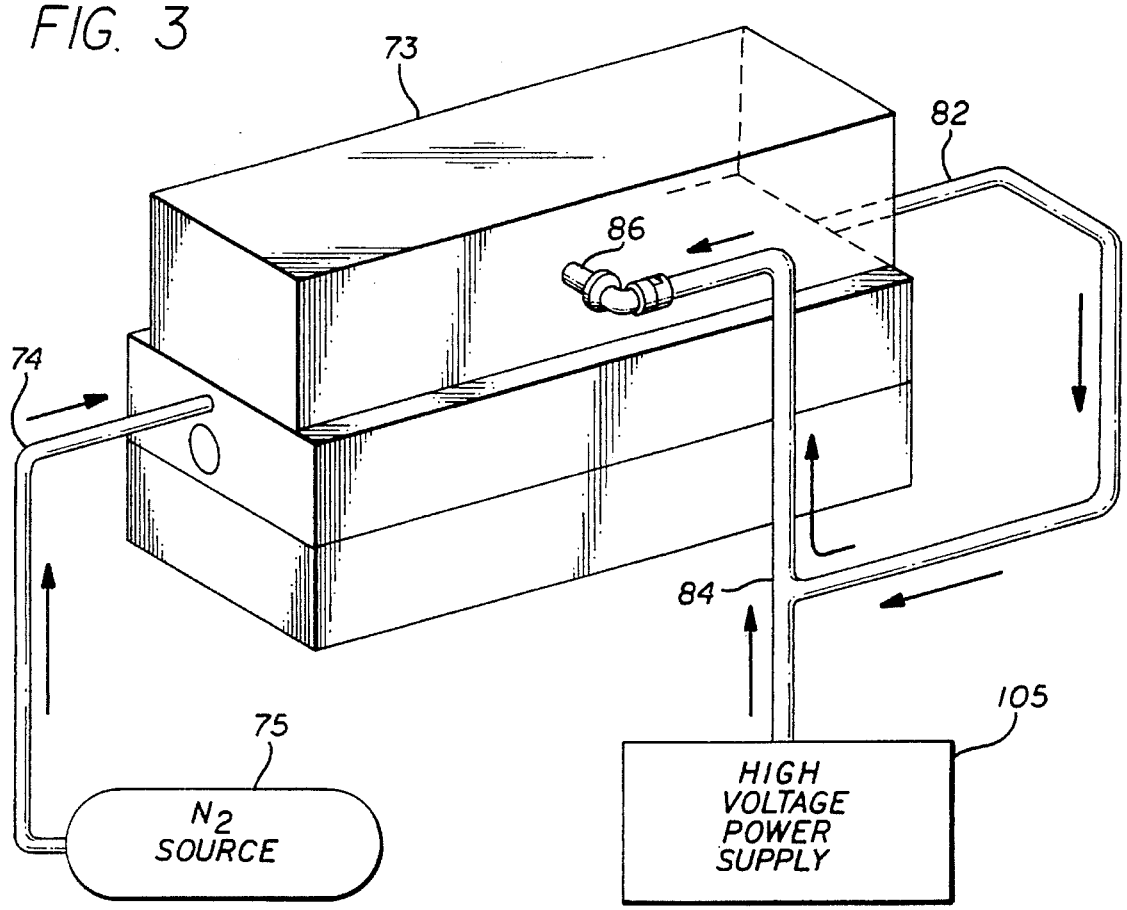
FIG. 3 is a schematic perspective view showing the housing for the laser and further showing the introduction of an inert gas (nitrogen) and a high voltage into a compartment above the housing.

To prevent the ozone from producing any deterioration in the bushings 32 and the main insulator plate 28, an inert gas such as nitrogen is circulated through the compartment 72. As the inert gas moves from the compartment 72, it carries the ozone with it, thereby removing the ozone from the compartment immediately after the ozone is formed. The inert gas such as nitrogen is introduced into the housing 11 through a hose 74 from a source 75 (FIG. 3). The inert gas then flows into the compartment 72 through a conduit 76 at the upper end of the housing member 12. The flow of the inert gas through the compartment 72 is indicated by arrows at the upper end of the compartment 72. The compartment 72 is defined by a housing 73 above the housing 11.

The inert gas then flows through a conduit 78 (FIG. 2) in the housing member 12 and a fitting 80 (FIG. 2) into one of end of a hose 82 (FIG. 3). The hose 82 communicates with one end of a hose 84. The other end of the hose 84 is extended through a fitting 86 (FIG. 3) made from an insulating material. The inert gas is then exhausted to the atmosphere. The exhaustion of the inert gas to the atmosphere does not have any deleterious effect since the atmosphere is composed primarily of nitrogen.

Figure 5:
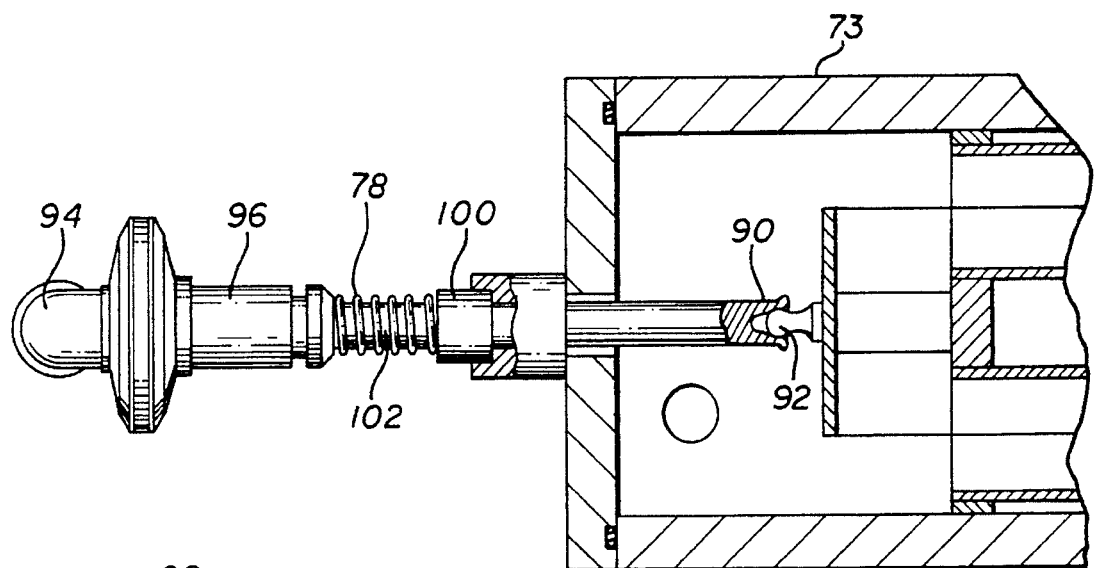
FIG. 5 is an enlarged fragmentary view, partially in section, of an arrangement in coupled relationship to the compartment above the housing of the laser for introducing inert gases into such compartment and for introducing high voltages into the compartment for introduction to the anode of a thyratron.

A high voltage wire 88 (FIG. 6) is centered in the hose 84 (FIG. 3) and is electrically insulated in the hose by the coaxial insulating material on the wire and by the inert gas such as nitrogen. The high voltage wire 88 is electrically coupled to a hollow annular contact 90 at the end where the hose 84 is coupled to the fitting 86. The voltage on the wire 88 is introduced through the electrical contact 90 and an electrical contact 92 (FIG. 5) in the upper housing 73 and through conductors (not shown) to the anode of a thyratron 142 in FIGS. 10, 11 and 19.

A swivel joint 94 (FIG. 6) made from a suitable electrically conductive material is provided as a part of the hose 84 and a collar 96 (FIGS. 5 and 6) is extended from the swivel joint 94 in electrically coupled relationship with the swivel joint. An electrically conductive spring 98 is connected at one end to the collar 96 and at the other end to an electrically conductive sleeve 100. The sleeve 100 and the spring 98 are disposed on an insulating member 102.

The spring 98 is constrained so that the sleeve 100 normally engages the contact 90 and grounds the contact. When the contact 90 is extended into the housing, the sleeve 100 becomes withdrawn on the insulator member 102 from the contact 90 so that the ground on the contact 92 is removed. Voltage can then be applied to the contact 90 from a high voltage power supply 105 (FIG. 3) to charge a capacitor 140 in FIGS. 10, 11 and 19.

Figure 7:
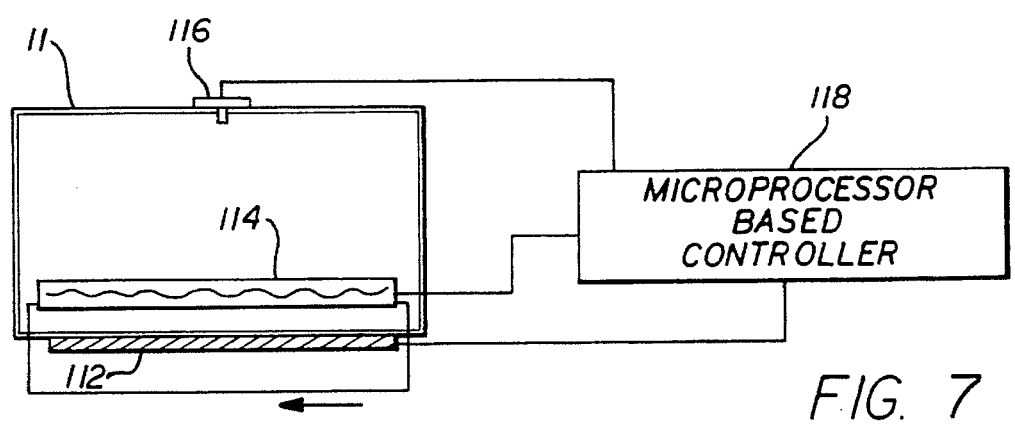
FIG. 7 is a schematic view of a subsystem for regulating the temperature of the gases in the housing at a particular value whether or not there is an electrical discharge in the housing.

FIG. 7 schematically shows an arrangement for precisely regulating the temperature of the gases 36 in the housing 11 (FIG. 1) at a particular value. The housing 11 is made from an electrically conductive material having non-corrosive and electrically conductive properties. The housing 11 is preferably provided with uniform properties as by providing the chamber with a configuration of a single material. This uniform construction of the housing 11 is desirable in precisely regulating the temperature of the gases 36 in the chamber.

A heater 112 is disposed on the housing 11 externally of the housing. A fluid such as water is disposed in a receptacle such as a pipe 114 in the housing 11. The water in the pipe 114 is recirculated and is cooled as by air during the recirculation. Such recirculation and air cooling are well known in the art and are disclosed in Pat. No. 4,959,840. A temperature probe or sensor 116 extends into the housing 11 to sense the temperature of the gases 36 in the housing. A microprocessor-based controller 118 receives the indications of temperature from the sensor 116.

Based upon the temperature indicated by the sensor 116, the microprocessor based controller 118 provides controls to the heater 112 and the cooling fluid 114 to regulate the temperature of the gases 36 in the housing 11 on a continuous basis. This temperature provides for an optimal operation of the laser 10. Since the heater 112 is disposed on the wall of the housing 11 and the housing 11 is a good heat conductor, the heat from the heater 112 is transferred directly into the housing. The rate of heat production by the heater 112 and the rate of flow of the cooling fluid through the pipe 114 are regulated to maintain the temperature of the gases in the housing 11 at a particular value on a continuous basis, whether the laser is operating or idle.

Figure 8:
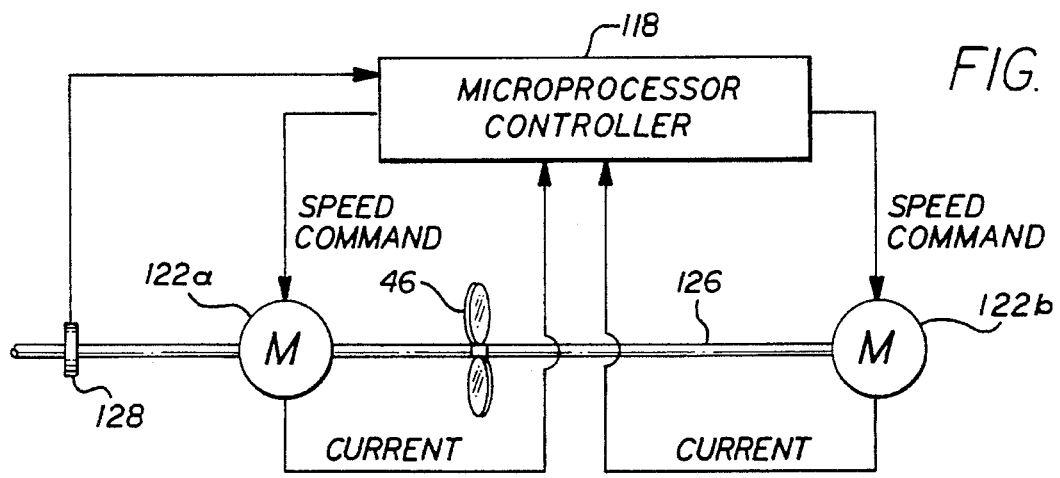
FIG. 8 is a schematic view of an arrangement of a fan and a pair of motors and a microprocessor controller for recirculating the gases in the housing and for operating the motors at a particular speed and in a balanced relationship.
Figure 9:
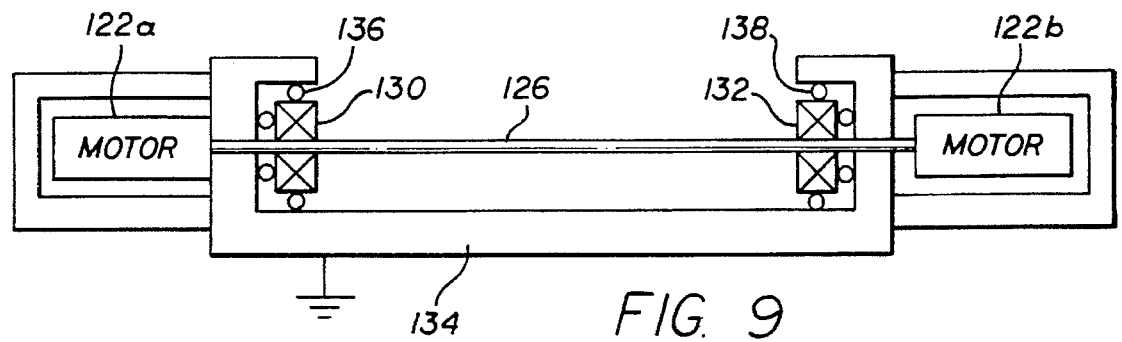
FIG. 9 is a schematic view of apparatus associated with one of the motors shown in FIG. 8 for electrically isolating the motor and damping any vibrations in the motor.

FIGS. 8 and 9 show an arrangement for driving the fan 50 (FIG. 1) for cooling the gases 36 in the chamber 11 (FIG. 1). To conserve space, two (2) motors 122a and 122b are provided on a common shaft 126 to drive the fan 46. The motors 122a and 122b have substantially identical characteristics. The operation of the motors 122a and 122b is controlled by the microprocessor-based controller 118 so that the motors drive the fan at a particular speed. This regulation may be provided by disposing a tachometer 128 on the shaft 126 and by introducing the output of the tachometer 28 to the microprocessor 118.

From the signal provided by the tachometer 128 measurement, the microprocessor 118 determines the rotational speed of the shaft 126. The microprocessor-based controller 118 then introduces signals to the motors 122a and 122b to regulate the speeds of the motors. In addition, the microprocessor-based controller 118 receives from the motors 122a and 122b indications of the currents in the motors, processes these indications and introduces signals to the motors to regulate the currents through the motors so that the currents are substantially equal. In this way, the motors 122a and 122b drive the fan 46 at the particular speed on a balanced basis.

The motors 122a and 122b and the shaft 126 are also shown in FIG. 9. In FIG. 9, the shaft 126 is rotatable on bearings 130 and 132. The bearings 130 and 132 are supported on a case 134 made from a suitable material such as stainless steel. The bearings are spaced from the case 132 as by mounts 136 and 138 made from a resilient material such as a fluorinated elastomer. In this way, any voltages generated as a result of the electrical discharge between the cathode 18 and the anode 20 are isolated electrically. Furthermore, any vibrations in the motors 122a and 122b are damped.

Figure 10:
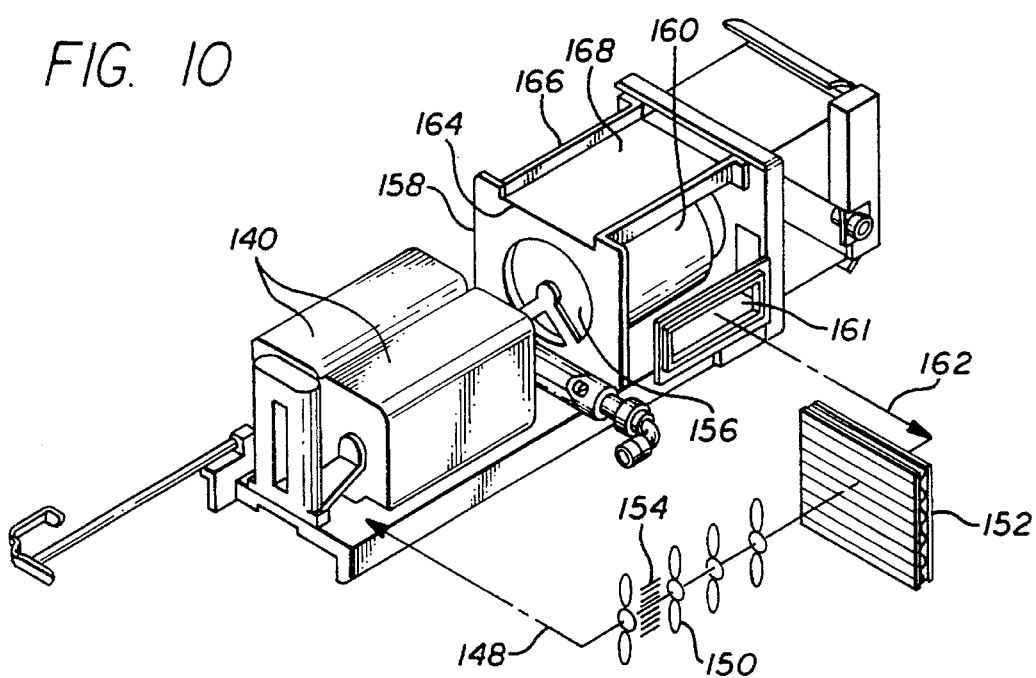
FIG. 10 is a perspective view of apparatus for cooling the high voltage components, including a thyratron, in the compartment above the housing.
Figure 11:
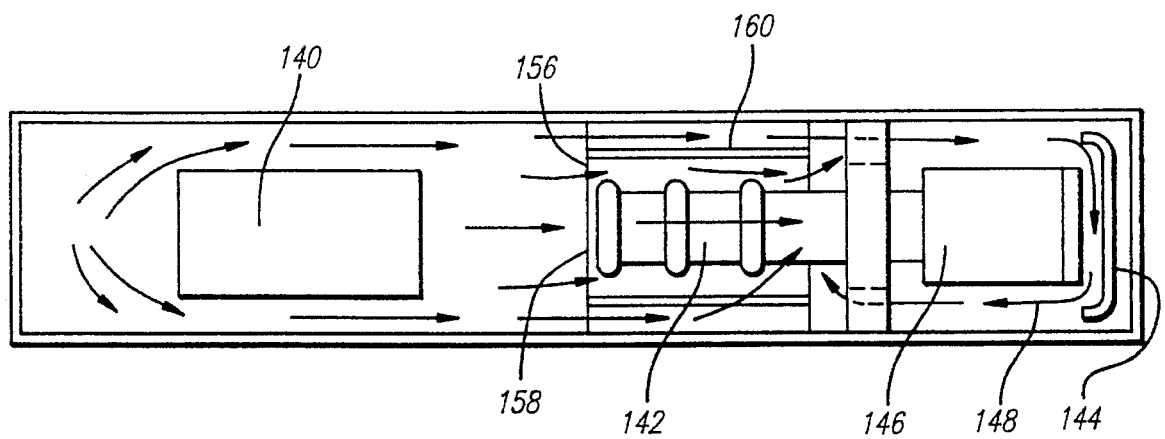
FIG. 11 is a schematic elevational view of the apparatus shown in FIG. 10 for cooling the high voltage components in the compartment.

FIGS. 10 and 11 show an arrangement for cooling the components which produce the voltage pulses applied to the cathode 18. These components include a pair of capacitors 140, a thyratron 142 and a trigger board 144 on which electronic circuits are disposed. The components also include a power supply 146 for the thyratron 142. When the capacitors 140 become charged to a particular voltage by the high voltage power supply 105, the trigger board 146 triggers the thyratron, causing the capacitors to discharge through the thyratron. The circuits for controlling the triggering of the thyratron 142 are well known in the art and are disposed on the circuit board 144. The power supply 146 provides power to the thyratron 142.

In FIGS. 10 and 11, air is cooled and recirculated through a closed loop 148 for cooling the capacitors 140, the thyratron 142, the trigger board 144 and the power supply 146. The closed loop 148 includes fans 150 for driving the air in the closed loop and also includes a medium such as a source 152 of a cooling fluid such as water for cooling the air. An array of small tubes 154 such as those provided by Hexcel are disposed between the fans to direct the movement of the air in the path indicated by the arrows.

As shown in FIGS. 10 and 11, the recirculating air flows past the capacitors 140. A portion of the air then flows through an orifice 156 in a wall 158 into the space between the thyratron 142 and an insulating chimney 160 made from a suitable material such as a ceramic. The air cools the thyratron 142 as it flows in the space between the thyratron 142 and the chimney 160. The air is then exhausted through a port 161 into a pipe 162 included in the closed loop. Another portion of the air flows through an opening 164 into a passageway 166 defined by the lower end of the housing member 73 (FIG. 3) and a guide member 168 disposed on the chimney 160. This portion of the air flows past the power supply 146 and along the trigger board 144, which is provided with curved configurations at its upper and lower ends to guide the air for movement along the trigger board and then into the exhaust port 161. The heated air is then cooled by the heat exchanger 52 and recirculated by the fans 150 in the closed loop 148.

Figure 12:
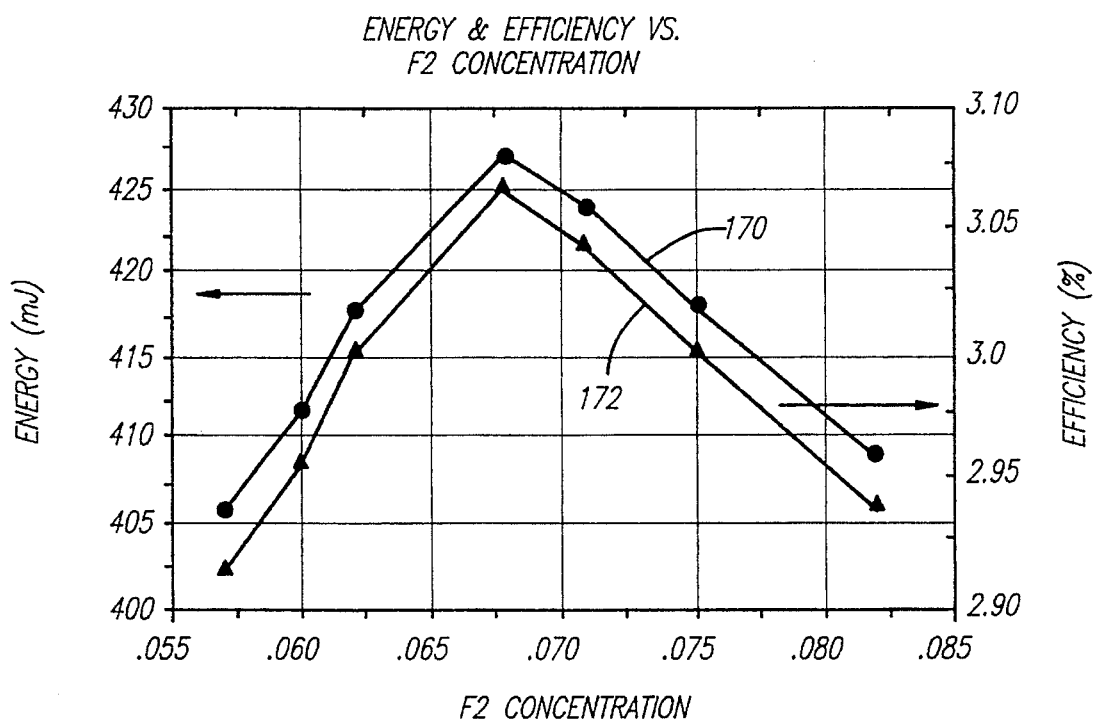
FIG. 12 shows curves of the energy and efficiency of each voltage pulse introduced to the cathode in relation to the concentration of one of the gases in the housing.

FIG. 12 shows a curve 170 in which the concentration of fluorine ($F_2$) is plotted on the horizontal axis and in which the energy in each output pulse is plotted on the vertical axis. FIG. 12 also shows another curve 172 in which the concentration of fluorine is plotted on the horizontal axis and in which the efficiency (in percent) of the laser 10 is plotted on the vertical axis. Here efficiency is defined as the ratio of laser energy and input electrical energy. As will be seen, the radiation energy in each output pulse in the laser 10 and the efficiency in the magnitude of the radiation energy in each output pulse in the laser relative to the magnitude of the input energy reach a peak at substantially the same concentration of fluorine in the housing 11. This peak is at a concentration of approximately 0.068% of fluorine ($F_2$). As will be appreciated, the laser 10 also contains krypton in a concentration in the order of one percent (1%). The remainder of the gas in the laser 10 constitutes a neutral gas such as neon.

Figure 13:
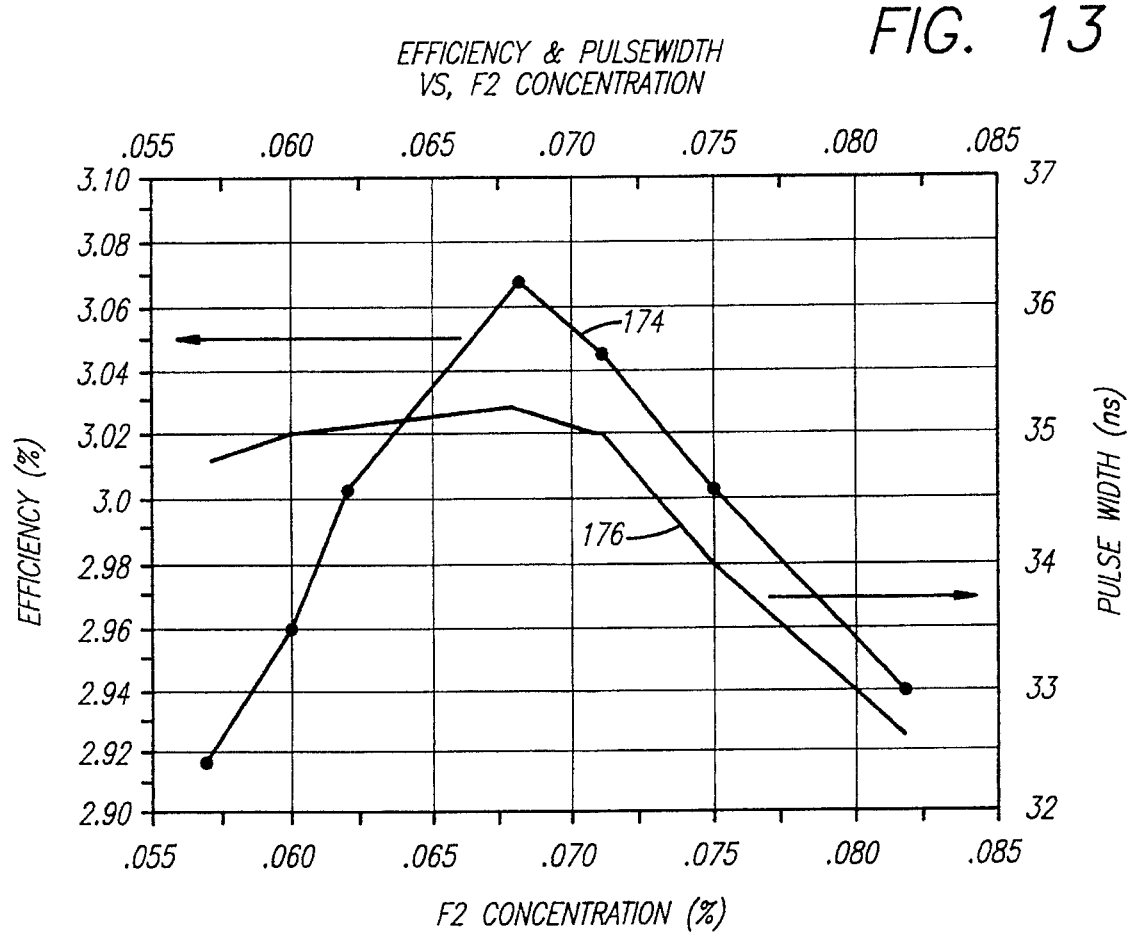
FIG. 13 shows curves of the efficiency and pulse width of the energy obtained from each voltage pulse introduced to the cathode in relation to the concentration of such one gas in the housing.

FIG. 13 also shows two (2) curves each with the concentration of fluorine ($F_2$) plotted on the horizontal axis. A curve 174 corresponds to the curve 172 in showing the relationship between the efficiency in the operation of the laser 10 and the fluorine ($F_2$) concentration. A curve 176 shows the relationship between the width (in nanoseconds) of the output pulses from the laser 10 for different concentrations of fluorine ($F_2$). As will be seen, the peak efficiency in the curve 174 and the peak in the pulse width in the curve 176 occur at substantially the same concentration of fluorine. This is substantially the same concentration as in the peaks of the curves shown in FIG. 12.

Figure 14:
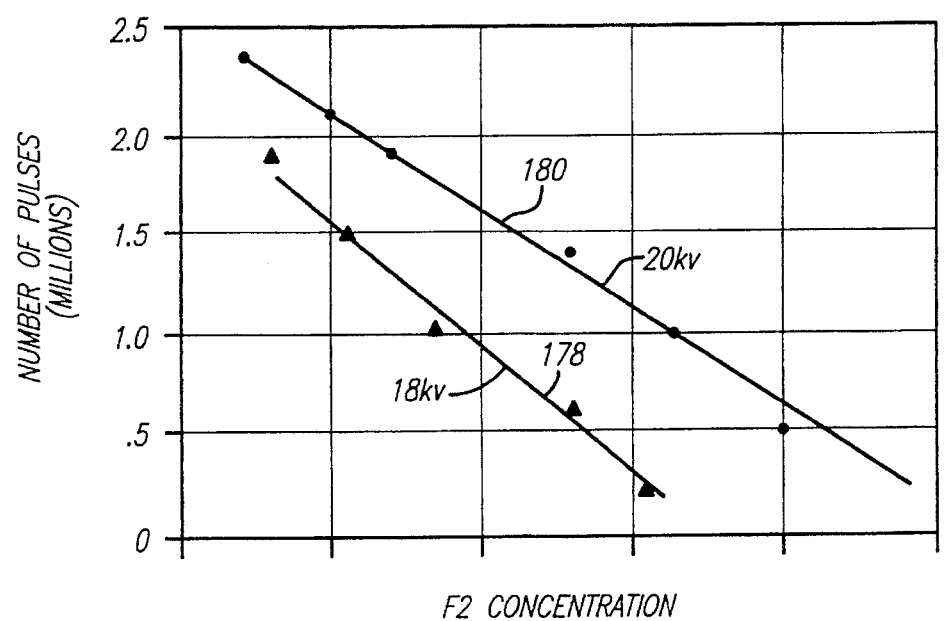
FIG. 14 shows curves of the number of voltage pulses for two (2) different magnitudes of voltage pulses introduced to the cathode in relation to the concentration of such one gas in the housing.

FIG. 14 illustrates the relationship between the number of pulses (shown in millions on the vertical axis) produced by the laser and the concentration of fluorine (the horizontal axis). FIG. 14 shows two curves 178 and 180 for two (2) different output energies, the curve 178 being for pulses of eighteen kilovolts (18 kV) between the cathode 18 and the anode 20 and the curve 180 being for pulses of twenty kilovolts (20 kV) between the cathode and the anode. As will be seen, without any addition of fluorine to the laser 10, the concentration of the fluorine progressively decreases in a linear relationship as the number of pulses from the laser increases.

The ultimate conclusion from FIGS. 12, 13 and 14 is that the concentration of fluorine in the housing 11 should be regulated at a value close to a concentration of approximately 0.068% in order to provide optimum energy from the laser 10 and optimum efficiency in the operation of the laser. This can be accomplished by initially increasing the concentration of the fluorine in the housing 11 in increments until the efficiency in the operation of the laser 10 and the maximum energy from the laser increase to peak values and then decrease slightly.

No further addition of fluorine to the chamber should then be made until the efficiency in the operation of the laser and the maximum energy from the laser increase to peak values and then decrease slightly. In this way, the concentration of the flourine in the housing 11 may be alternately regulated between a value of approximately 0.070% and a value of approximately 0.066% to obtain peak energies from the laser 10 and peak efficiencies in the operation of the laser. Experience has shown that a laser operating at its maximum efficiency has an enhanced reliability and increased lifetime of the components in the laser.

A common technique to operate the laser 10 near its maximum efficiency is to fill the laser with just the right amount of halogen and then, as the number of pulses accumulate, replenish the halogen donor by injecting a small amount of the donor into the laser. For an industrial laser, the process of halogen injection should be automated However, the process of halogen injection can be automated only if the halogen concentration in known. In excimer laser gas mixes, the halogen concentration is typically less than one tenth of one percent 0.1%. Therefore, the instrumentation to measure halogen concentration is too complex and expensive for an industrial laser.

This invention provides a halogen injection technique which operates the laser near its optimum efficiency. It relies on the feet that the halogen depletion rate as a function of input energy is known for a laser and that this depletion rate is linear as shown by the curves 178 and 180 in FIG. 14. Therefore, after a certain number of pulses, the halogen concentration can be estimated. An extremely small amount of halogen (a perturbation) is then injected into the laser gas. This perturbation to the laser gas medium could possibly result in an increase or decrease in laser efficiency. Depending upon whether this perturbation results in an increase or decrease in laser efficiency, additional increments in the halogen are introduced into the housing 11.

An increase in laser efficiency is an indication of a halogen-depleted laser gas, and further halogen injections are continued until there is no increase in laser efficiency. A halogen injection resulting in a decrease in laser efficiency is indicative of a gas mixture which is either too rich or just optimum in halogen. Since the halogen injection is only a perturbation of the Gas mixture, the resulting change in laser efficiency is very small but just enough to terminate further injections.

In the following paragraphs, a microprocessor-based implementation of the aforementioned $F_2$ injection technique is described for a KrF laser. The implementation for other excimer gases is similar. The algorithm described in the following paragraphs is also self-learning in the sense that it corrects for situations when a halogen is injected either too soon or too late.

Figure 15:
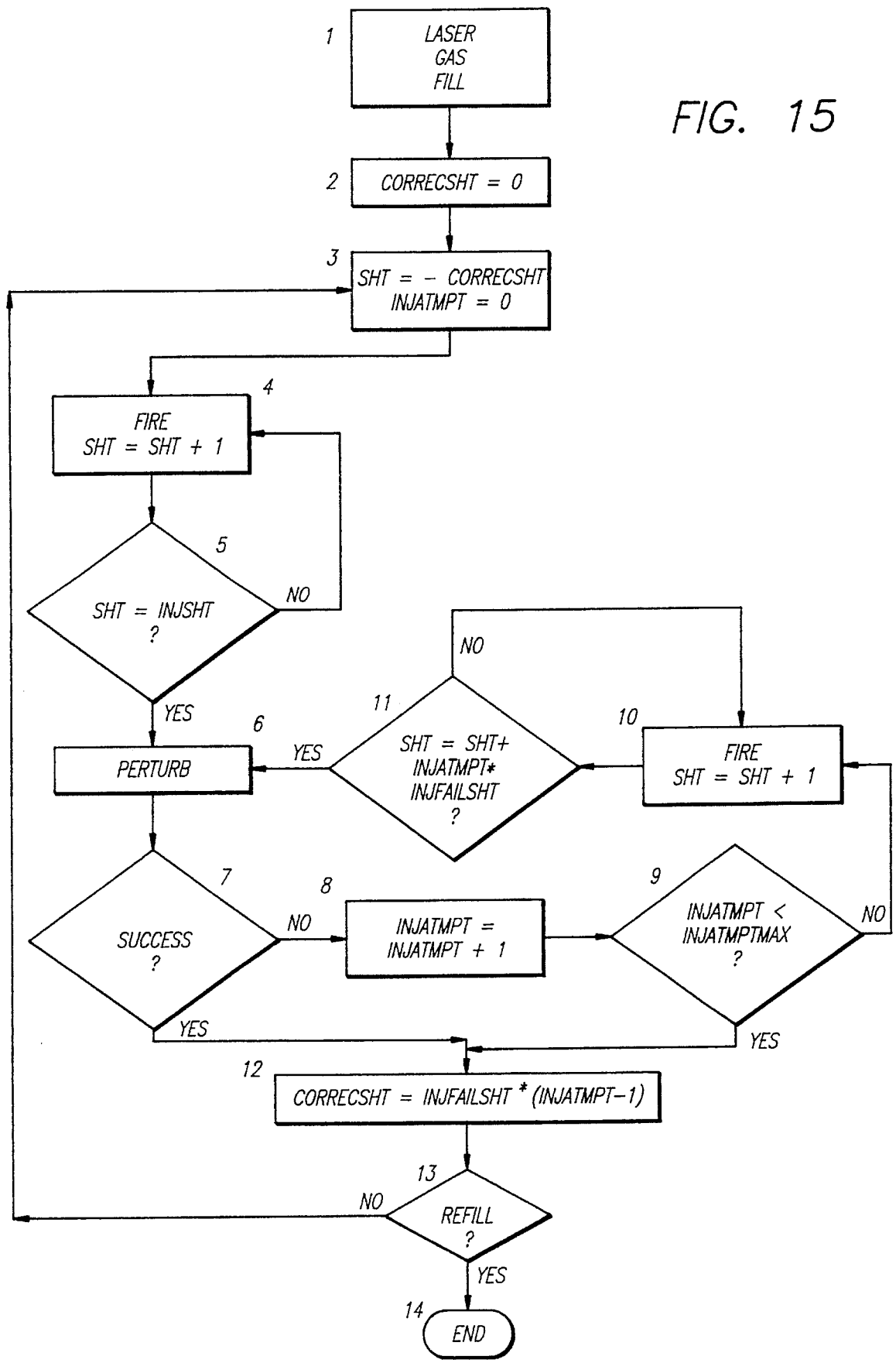
FIG. 15 is a flow chart schematically illustrating how the concentration of such one gas in the housing is regulated near an optimal value.
Figure 16:
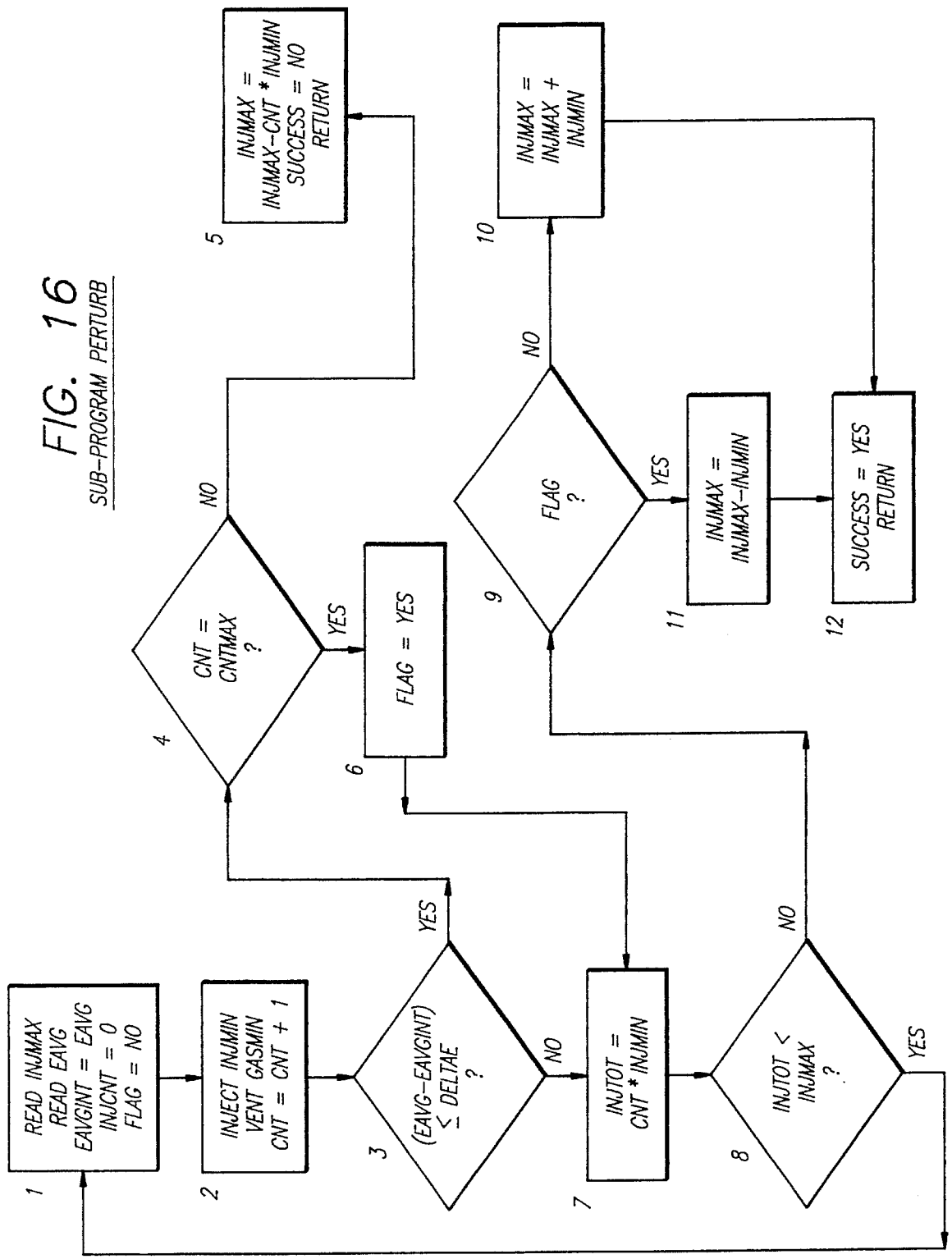
FIG. 16 is an expanded flow chart of one of the steps shown in the flow chart of FIG. 15 and schematically illustrates additional details of the operation of regulating the concentration of such one gas near the optimal value.

In the embodiment of the invention shown in FIGS. 15 and 16, the microprocessor controller 118 commences its $F_2$ injection program when the laser chamber is filled with fresh laser gas. In this example, the laser gases are krypton, fluorine and the buffer gas neon. The microprocessor controller 118 retains in its non-volatile memory a look-up table pertaining to $F_2$ consumption as a function of input voltage and the number of laser pulses. The data in the look-up table is based on detailed parametric studies performed on similar lasers.

Figure 14A:
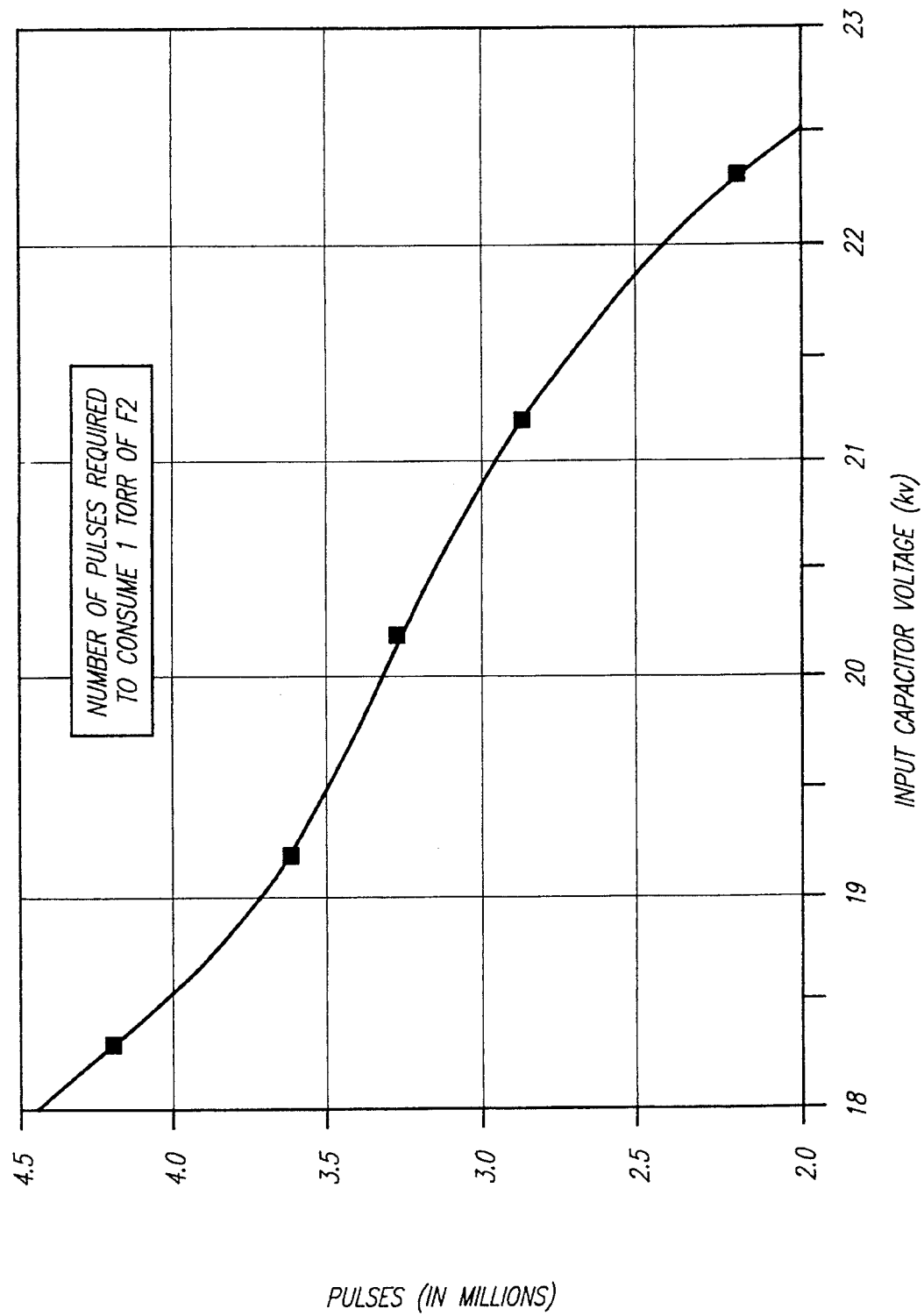
FIG. 14A is a curve showing the relationship between the number of pulses for producing one (1) Torr of a particular gas such as fluorine ($F_2$) and the voltage on an input capacitor connected in a circuit with the thyratron.

Experience has shown that lasers which are similar in construction and output performance have approximately the same $F_2$ consumption characteristics. A sample table is shown in a graphical form in FIG. 14A. FIG. 14A is a curve showing the relationship between the number of pulses for producing one (1) Torr of a particular gas such as fluorine ($F_2$) and different values of the voltage introduced to the capacitors 140 in FIGS. 10, 11 and 19. From FIG. 14A, one can estimate the number of pulses required to consume 1 Torr of $F_2$ at a predetermined voltage of the capacitors 140. If the average voltage for a given number of pulses is known, the amount of consumed $F_2$ can be estimated as indicated in FIG. 14A.

In practice, as the laser 10 operates, the input voltage varies depending upon the output energy requirements and upon a host of other parameters which affect laser output. The microprocessor-based controller 118 computes a running average of the operating voltage and periodically refers to the look-up table such as shown in FIG. 14A to compute an estimate of the decrease in $F_2$. After a predetermined decrease in $F_2$, an injection is initiated. The permissible decrease in $F_2$ concentration capable of initiating an $F_2$ injection is determined from the energy vs. $F_2$ concentration curve, similar to the one indicated at 170 in FIG. 12.

The specifics of the $F_2$ injection method are shown in the flow charts shown in FIGS. 15 and 16. The following paragraphs are numbered to correspond to numbered steps in FIG. 15. For example, the paragraph numbered "5" below refers to the step numbered as "5" in FIG. 15. The numbers in FIG. 15 are to the left of the designated steps in the flow chart.

1. The LASER GAS FILL initiates the $F_2$ injection method. In this step, the housing 11 is filled with the gases providing the chemical reaction. These gases may comprise krypton, fluorine and an inert gas such as neon. The fluorine concentration is approximately equal to the optimal value.

2. Immediately after the gas fill, a variable, CORRECSHT, is initialized to zero. This variable, an integer, is a correction to the initial estimate of the number of pulses after a gas fill when the $F_2$ injection is initiated. As will be seen subsequently, this variable can be either positive or negative and accounts for deviations in the $F_2$ consumption of a laser from the look-up table (FIG. 14A).

3. Two other variables, both integers, are initialized. These are SHT and INJATMPT. SHT is a count of the number of pulses a laser fires after a gas refill or after a $F_2$ inject. It is initialized to -CORRECSHT. After a gas fill, SHT is set to 0. As will be seen subsequently, the counter is initialized every time a gas fill or a $F_2$ inject occurs. INJATMPT is the number of attempted injections, starting with the initial value of 0. The counter INJATMPT will be clarified subsequently.

4. The counter SHT increments every time the laser fires. As the laser fires, the microprocessor controller 118 computes a running average of the voltage provided that SHT is greater than zero (0). The microprocessor-based controller 118 then utilizes the look-up table (FIG. 14A) and computes the decrease in $F_2$ concentration based on the value of SHT.

5. At a particular value of SHT designated by INJSHT, the $F_2$ concentration is determined by the microprocessor-based controller 118 to have decreased by a predetermined amount so that a noticeable decrease in laser efficiency has occurred.

6. An $F_2$ injection is initiated as by a procedure known as PERTURB. The procedure PERTURB is shown in the form of a flow chart in FIG. 16. It is described subsequently.

7. PERTURB returns a value for a Boolean variable SUCCESS. An $F_2$ injection is considered a failure if it results in a measurable decrease in laser energy or efficiency. In other words, success is set to NO.

8. If SUCCESS is NO, the counter INJATMPT is incremented by 1. This means another unsuccessful injection attempt was made.

9. The program permits only a certain maximum of injection attempts designated by INJATMPTMAX. An excess of attempted injections can lead to a laser gas mix that is too rich in $F_2$.

10. If the number of attempted injections is less than the permitted maximum, the counter SHT is incremented by an integer every time that the laser fires.

11. An $F_2$ injection is retried via the sub-program PERTURB when the SHT counter increments by a small number of pulses. This small number is designated by the integer constant INJFAILSHT. It is usually selected to be a fraction of typical INJSHT values.

12. If the number of attempted injections is equal to the permitted maximum, the process of injection is terminated and a new value for CORRECSHT is calculated. The next injection will be offset by an amount equal to CORRECSHT. Its value can be positive or negative. If, in Step 7, SUCCESS returns yes, the integer INJATMPT will be zero. In this case, the value of CORRECSHT is negative–that is CORRECSHE=INJFAILSHT. When the first injection attempt results in an increase in laser efficiency (or power), this suggests that the laser has probably been operating with less than optimal $F_2$. Therefore, during the next cycle, the SHT counter is equal to CORRECSHT instead of zero (0) so that the next injection occurs INJFAILSHT pulses earlier. If INJATMPT is greater than one (1), the next injection is delayed by an amount equal TO CORRECTSHT.

13. A gas refill (i.e. the laser is evacuated and replaced with fresh gas) terminates the cycle. Otherwise the cycle continues.

SUB-PROGRAM PERTURB

The details of the procedure PERTURB are shown in the flowchart designated as FIG. 16. This procedure is important in the Injection technique. The following paragraphs are numbered to correspond to the numbered paragraphs in FIG. 16. The numbers in FIG. 16 are to the left of the designated steps in the flow chart.

1. Upon entry into the PERTURB procedure, the microprocessor-based controller 118 reads a value for the maximum amount of $F_2$, INJMAX, which can be injected in this perturbation. This value is provided by the user and, after each gas refill, INJMAX initializes to this value. However, as the laser pulses and $F_2$ injections occur between gas fills, the value of INJMAX is adjusted as described below. The microprocessor-based controller 118 also reads the value of EAVG. This is either the average value of laser energy if the laser is working at a constant input voltage, or it is the laser voltage if the laser is operating at a constant output energy. A variable EAVGINT is set to this value of EAVG. A counter CNT is initialized to 0. FLAG is a Boolean variable and is set to NO. Its role will be described subsequently.

2. A small amount of $F_2$ INJTMIN is then injected into the laser. In practice, after the injection, an identical amount of the gas mix is vented from the laser in order to maintain a constant laser pressure. The counter CNT is incremented as the laser fires. The microprocessor-based controller 118 reads a new value for EAVG. The value of INJMIN is determined by the user and usually depends upon the resolution of the pressure measuring device.

3. The difference in EAVG and EAVGINT is then compared with DELTAE, a user supplied number. In principle, DELTAE could be 0. However, in practice, because of the inherent pulse-to-pulse variation in the laser energy or voltage, DELTAE is set to a non-zero value. If the laser is operating at constant energy, DELTAE corresponds to the regulation of the voltage. In the constant energy mode, DELTAE is the statistical standard deviation of the laser energy.

4. If it is determined that the difference is less than or equal to DELTAE, then the counter CNT is compared with a predetermined maximum CNTMAX. This maximum is necessary to ensure that CNT does not assume large values (i.e. too many INJMIN), implying that the laser gas becomes enriched with $F_2$.

5. If CNT has not exceeded CNTMAX, a new value for INJMAX is calculated. INJMAX is smaller than its previous value by an amount equal to the amount just injected in this unsuccessful attempt. The Boolean variable SUCCESS is set to NO and is returned to the main program. When the sub-program is revisited, INJMAX has a different value.

6. If CNT has exceeded CNTMAX, the Boolean variable FLAG is set to YES. The sub-program proceeds to the next step, implying that the process of injection is continued. In other words, the fact that EAVG is less than EAVGINT is ignored. Such a step is taken to guard against a possibly small decrease in laser energy when the $F_2$ concentration in the laser is near optimum. As will be seen subsequently, the state of the FLAG is also used to vary INJMAX.

7. The total amount of $F_2$, INJTOT, is calculated.

8. The amount of $F_2$, INJTOT, is then compared with the maximum INJMAX read by the microprocessor controller 118 in step 1. If the total $F_2$ injected so far is less than the maximum, the sub-program recycles.

9. If not, the state of the FLAG variable is checked.

10. If the check indicated in Step 9 is YES, then possibly the amount of $F_2$ slightly higher than optimal was injected and the maximum value of INJMAX is reduced by INJMIN.

11. If the check indicated in Step 9 is NO, each injection has resulted in an increase of EAVG over EAVGINT. Possibly, the laser is lean in $F_2$. Therefore, INJMAX is incremented by INJMIN.

Thus a new $F_2$ injection technique is described which strives to maintain the $F_2$ concentration in the laser 10 near its optimal value. The technique first estimates the decrease in the concentration based upon input voltage. The process of injection involves perturbing the laser gas with a small amount of $F_2$ and then looking for a change in the laser output. An increase in output continues the process of injection, but a decrease terminates the process. Since the amount of injected $F_2$ is small, the laser $F_2$ concentration does not deviate far from its original value. The technique is self-learning. Therefore, as the laser operates, all of the critical parameters of the $F_2$ injection technique are automatically adjusted to maintain nearly optimal $F_2$ concentration.

Pulsed laser applications, such as materials processing, require a known amount of laser energy incident upon the material being processed. In fact, in most of these applications, process control is achieved by controlling the energy incident upon the surface of the material. Therefore, an industrial laser is equipped with an energy detector which measures the energy of each laser pulse. The laser-based micro-controller communicates the energy to the user's controller. Upon command from the user, the laser-based microcontroller can adjust its operating conditions to maintain constant laser energy or change the laser energy to a new value.

Occasionally, a malfunctioning component or subsystem in the laser can result in less-than-expected energy. Such low energy events can be random or frequent and can result in loss of process control. Typically, if the laser energy deviates from a user specified range, the laser controller can be programmed to terminate laser operation. Trained service personnel are then required to isolate the malfunctioning component or sub-system. Experience has shown that trouble-shooting for the cause of lower than expected energy can be laborious and long. This is especially the case when the problem occurs only when the laser is operating, i.e. under dynamic conditions. Dynamic problems require the use of specialized diagnostic tools operated by well-trained service personnel.

An example of a dynamic problem is a thyratron which switches energy from the capacitor to the laser before it is triggered (i.e. the thyratron prefires). The equipment to detect a thyratron prefire is a pulsed high-voltage probe and a digital storage oscilloscope. On the other hand, a static problem manifests itself even when the laser is not operating such as from a dirty laser window. Simple visual inspection can usually detect dirt on a laser window. Therefore, these problems are relatively easy to isolate and solve.

Industrial equipment with built-in dynamic diagnostics to monitor system performance are now being routinely used. These diagnostics reduce equipment down time by helping the user isolate the cause of the problem. Additionally, they provide valuable data to the equipment manufacturer about component or sub-system performance and lifetime. This embodiment of a laser system incorporates a novel implementation of microprocessor controlled diagnostics built into an industrial laser such as an excimer laser. These diagnostics are placed in various critical locations in the laser. The microcontroller continuously monitors these diagnostics. When it detects a low energy pulse, it examines and analyzes its stored data from these diagnostics and informs the user about the likely cause of the problem. In their absence, the user might have to resort to a series of troubleshooting steps to first duplicate the problem and then isolate the faulty component.

Figure 17:
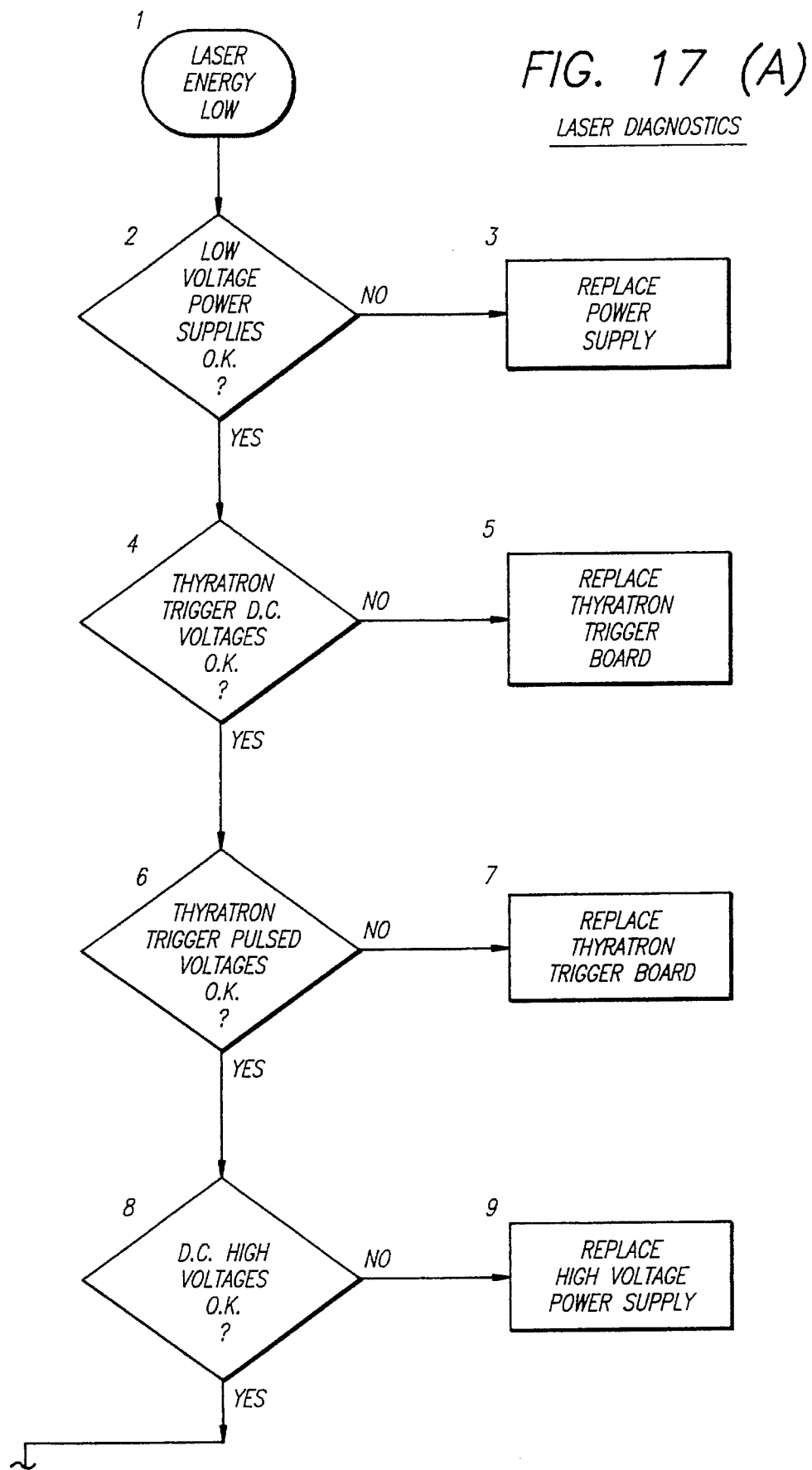
FIGS. 17A and 17B are flow charts cumulatively showing the sequence of tests performed on the different high voltage components when the required high voltage pulses are not being introduced to the cathode.
Figure 17:
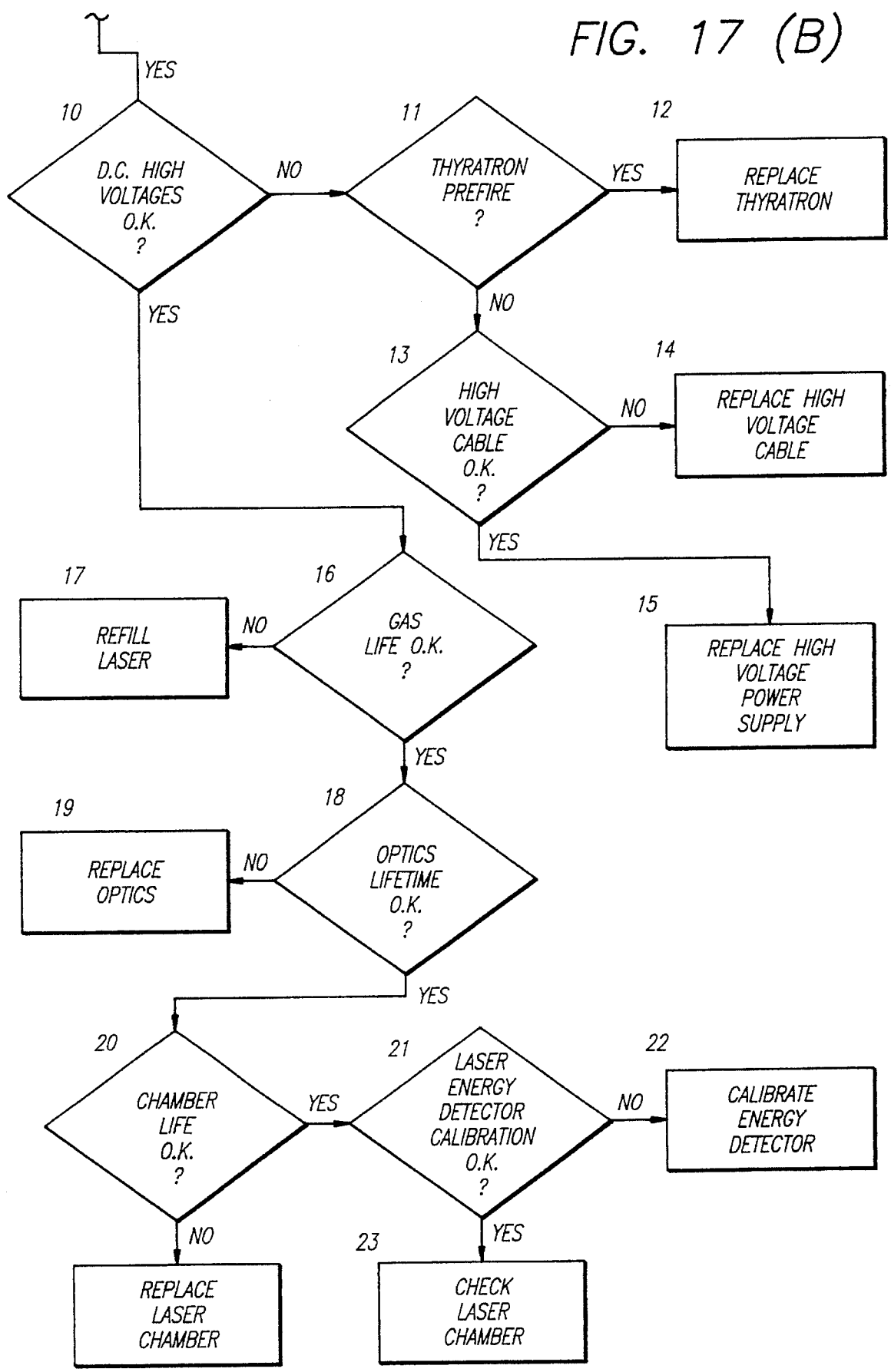

The process of automated diagnostics can be clearly described with the help of the cumulative flow-chart in FIGS. 17A and 17B. Each step in the analysis is numbered in FIGS. 17A and 17B, and the numbered paragraphs below refer to such numbers in FIGS. 17A and 17B. The details of the diagnostic hardware are not described. Most are voltage or current sensors whose analog outputs are converted by analog-to-digital converters and then monitored by the laser-microcontroller. Wherever required, the signals are appropriately filtered for noise (radio frequency) reduction.

(1) The laser microprocessor-based controller 118 determines that the laser energy is below the user's specified value by an amount greater than the user specified tolerance. The laser is shut down and requests service from the user. In the following steps, the microprocessor-based controller 118 analyzes its stored data and indicates to the user the probable cause.

(2) The microprocessor-based controller 118 checks whether the magnitudes of low voltage power supplies in the laser (5, 12, 24, 48, 6.3 VDC, etc.) are within specified tolerances. Since some of these voltages are used as references, significant deviation in their magnitudes can cause calibration errors.

(3) Replace the appropriate faulty power supply.

(4) The micro-based controller 118 now checks or measures the DC voltages on the thyratron trigger board 144 (see FIGS. 10 and 11). Proper voltage sensors at key locations on the board indicate whether the power supply or the critical solid-state switching elements are operating normally. The DC voltages not only generate the pulses to trigger the thyratron 142, but also various bias voltages required for proper operation of the thyratron.

(5) Replaces the thyratron trigger board 144 since one or more voltages are outside predetermined range.

Figure 19:
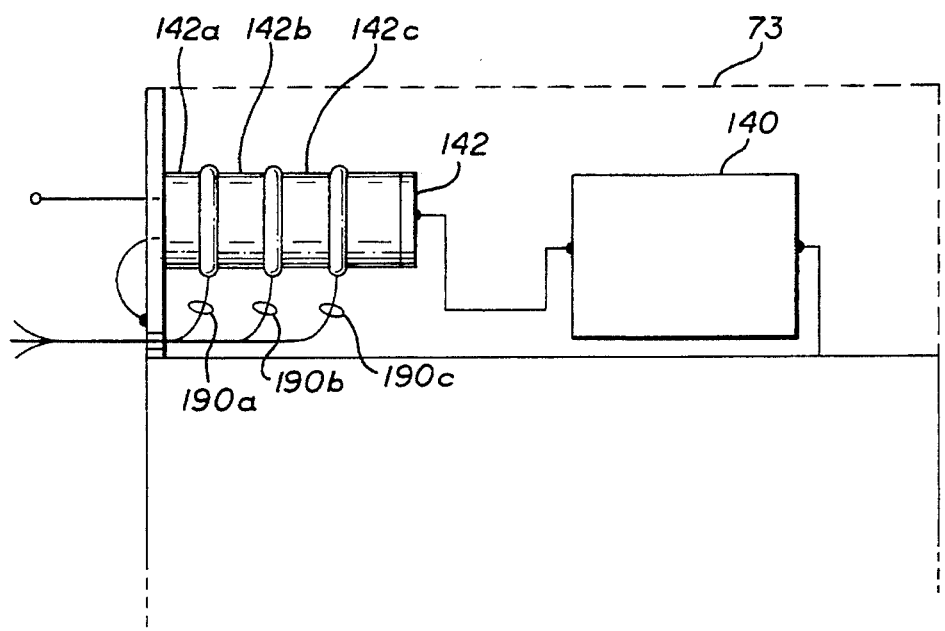
FIG. 19 is a schematic representation of tests performed on the different sections of a thyratron included in the high voltage components shown in FIGS. 10 and 11.

(6) Even if DC voltages on the trigger board 144 are normal, its switching elements may be malfunctioning. The switching elements generate three pulses in a particular sequence to the thyratron 144 (FIG. 19). Three current sensors 190a, 190b and 190c sense these pulses. (In practice, the outputs of the current sensors are filtered, integrated and compared to references).

(7) Replace the thyratron trigger board 144 if one or more of the trigger pulses are outside the specified tolerances.

(8) The high voltage power supply (HVPS) 105 in FIG. 3 has built in diagnostics, typical of any commercial supply. These diagnostics detect fault conditions inside the supply and shut it down and report the faults to the microcontroller.

(9) Replace the supply 105 if a fault is detected.

Figure 18A:
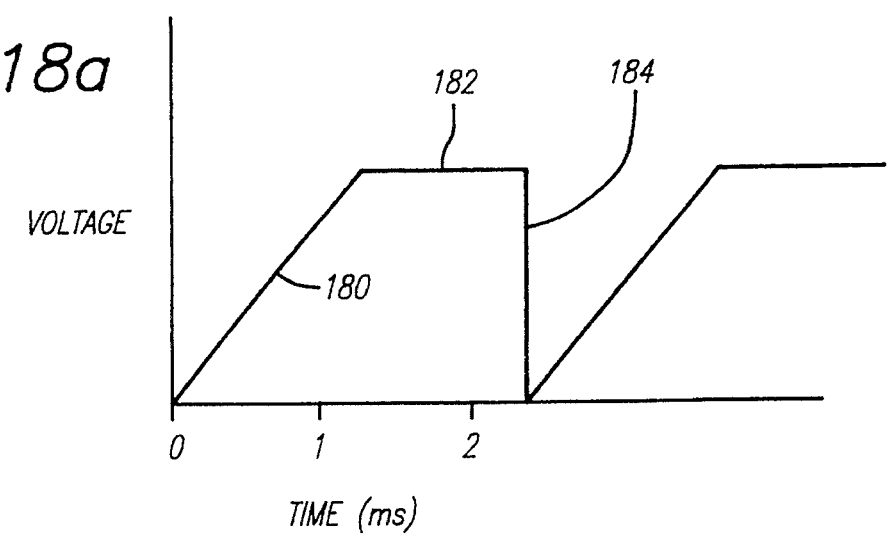
FIG. 18a and 18b are respectively schematic representations of the voltages produced on the anode of the thyratron and the corresponding currents through the anode of the thyratron when the power supply is operating properly to produce the high voltages.
Figure 18B:
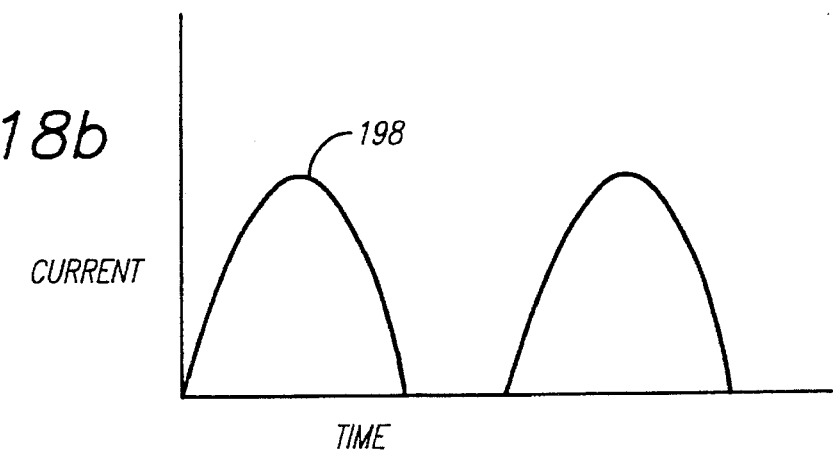

(10) Occasionally, the HVPS may not detect or report a fault even if it has no output. For instance, if there is no power to the HVPS (due to a blown fuse), the supply would neither have any output nor report a problem. The HVPS uses a voltage sensor coupled with a feed-back circuit to regulate its output voltage. The voltage sensor monitors the output of the HVPS. A malfunction here can result in an erroneous output voltage. A corresponding current sensor also exists in the HVPS. Both of these sensors are monitored by the laser controller 118. The voltage sensor signal is used by the laser controller 118 to determine whether the HVPS output is equal to its command voltage. Under normal conditions, the HVPS charges the capacitors 140 in FIG. 19 to the command voltage. The voltage sensor signal as monitored by the controller 118 is seen in FIG. 18a. Once the command voltage has been attained (182), the HVPS ceases to charge the capacitor. In FIG. 18b, the current wave form 198 is shown. As soon as the capacitors 140 are charged to the command voltage, the charging current ceases.

Figure 18C:
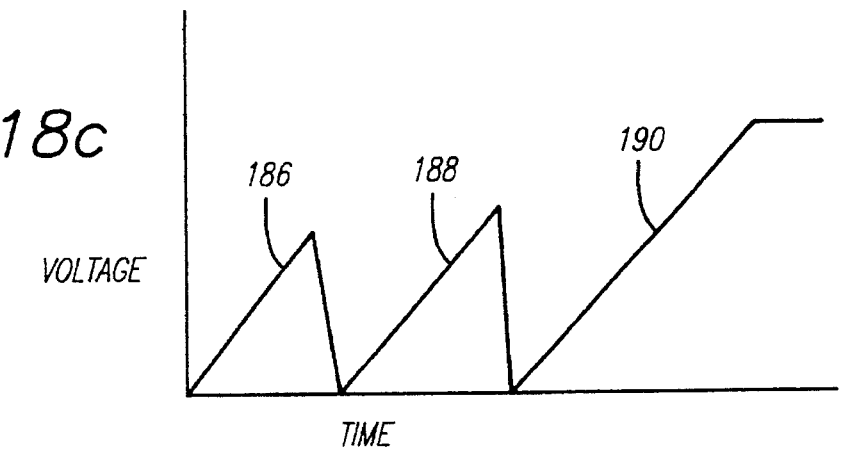
FIG. 18c is a schematic representation of the voltages produced on the anode of the thyratron when the thyratron is prefiring.

(11) Before any conclusion can be reached about the well-being of the HVPS, the controller 118 checks or measures for any thyratron 142 prefire. Thyratron prefires can be explained by comparing FIGS. 18a and 18c. In FIG. 18a after the capacitor attains the command voltage 182, the thyratron 142 switches the capacitor energy into the laser as indicated at 184. Thyratron switching is performed by the thyratron trigger board and is initiated by the laser microprocessor controller 118. However, under some circumstances, the thyratron 142 can self-switch, before the command of the microprocessor controller 118, i.e. it prefires. The self switching can be seen at 186 in FIG. 18c. Before the capacitors 140 have charged to the command voltage, the thyratron 142 prefires. The voltage of the capacitors 140 drops to zero. Subsequently, the HVPS continues charging the capacitors 140 as indicated at 118 in FIG. 18c, but the capacitors 140 do not reach the command voltage before the microprocessor-based controller 118 initiates the thyratron trigger. In practice, the microprocessor-based controller 118 looks for any drop in voltage once it has initiated a charge command and before it initiates the thyratron trigger command. Any drop in voltage is considered to be a prefire of the thyratron 142.

(12) A prefire of the thyratron 142 is detected and reported. If prefire rate is greater than a predetermined rate (e.g. 1 in a million), a thyratron change is requested.

Figure 6:
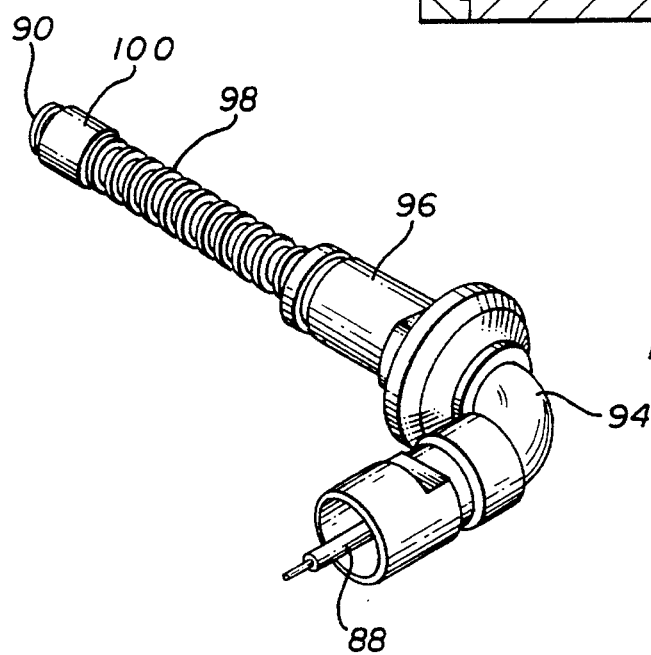
FIG. 6 is an enlarged fragmentary perspective view of components in the arrangement shown in FIG. 5 but with the components decoupled from the housing shown in FIG. 4.

(13) If the microprocessor-based controller 118 detects a HVPS current as indicated at 198 in FIG. 18b, but no voltage 180 and 182 as indicated in FIG. 18a it concludes that possibly the high voltage cable 88 in FIG. 6 is defective or shorted.

(14) The controller requests service on the HV cable assembly.

(15) The controller does not detect any voltage or current from the HVPS, possibly due to an internal fault in the HVPS. The supply is probably completely inoperative. It requests HVPS service.

(16) After every gas refill, the microprocessor-based controller 118 initializes a counter to zero. As the laser fires, the counter is incremented. The controller compares the value of this counter to a predetermined maximum.

(17) If the counter exceeds the predetermined maximum, the microprocessor-based controller 118 requests a gas refill. This has been described above in detail and is shown in FIGS. 15 and 16.

(18) Counters associated with the laser resonators and optical elements 46 are initialized when they are replaced or serviced. As the laser fires, these counters are incremented. The controller compares their values to a predetermined maximum.

(19) If any one of the counters exceeds its limits, service is requested.

(20) The laser chamber counter is checked or read against its predetermined maximum.

(21) If the laser chamber counter does not exceed the maximum, the user is asked to check the calibration of the laser energy detector against an absolute energy/power meter.

(22) If the laser detector is miscalibrated, the user is asked to calibrate the detector against the power meter.

(23) If the calibration is satisfactory, the user is asked to examine the laser chamber for any obvious defects. The user's attention is then drawn to a trouble-shooting manual which elaborates possible chamber problem.

(24) If the chamber shot counter exceeds the maximum, the user is requested to replace the laser chamber.

An automated laser diagnostic system for an industrial excimer laser has been described and is shown in FIGS. 17A and 17B. The signals from several dynamic and static diagnostic sensors are stored and examined when the laser's performance is below par. The stored data is compared to predetermined values, and any deviation is reported to the user as a probable cause—all of this in a fraction of a second. On the other hand, the absence of automated diagnostics would require special tools, skilled workers and valuable manufacturing time to achieve the same results.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A method of monitoring in a laser system a thyratron having different portions, a thyratron power supply, a power supply for a filament in the thyratron, a trigger board and a cable into the housing to determine if these components are operative to produce a voltage pulse between a cathode and an anode in the laser, including the steps of:

periodically measuring the thyratron voltage to determine if the thyratron prefires before a first particular voltage has been applied to the thyratron and providing an indication that the thyratron should be replaced if the thyratron prefires before this first particular voltage is produced, if the thyratron does not prefire in each periodic measurement before the particular voltage is reached, measuring the voltage from the power supply and providing an indication that the power supply should be replaced if such measurement indicates the voltage from the power supply is not at a second particular value, if there is an indication in each periodic measurement that the voltage from the power supply is at the second particular value, measuring the voltage on the filament of the thyratron and providing an indication that the filament power supply should be replaced if such measurement indicates that the filament voltage is not at a third particular value, if there is an indication in each periodic measurement that the filament power supply is at the third particular value, measuring the currents through the different portions of the thyratron and indicating that the power supply should be replaced if such measurement indicates that the currents through the different portions of the power supply are not at fourth particular values, and if there is an indication in each periodic measurement that the currents through the different portions of the power supply are at the fourth particular values, measuring the thyratron current and indicating that the cable should be replaced if such measurement indicates that the current through the thyratron is not at a fifth particular value.

2. A method as set forth in claim 1 wherein the measurements of the thyratron voltage, the power supply voltage for the thyratron, the thyratron filament voltage and the trigger board voltage respectively provide an indication that an individual one of the thyratron, the thyratron power supply, the thyratron filament power supply and the trigger board should be replaced in accordance with the results of such measurements.

3. A method as set forth in claim 1 wherein the measurements of the currents through the different portions of the thyratron, the current from the high voltage source and the thyratron current respectively provide an indication that an individual one of the trigger board, the thyratron power supply and the cable should be replaced in accordance with the results of such measurements.

4. A method of monitoring in a laser system a thyratron having different portions, a power supply for the thyratron, a power supply for a filament in the thyratron, a trigger board for triggering the thyratron and a cable from the thyratron power supply to determine if these components are operative to produce voltage pulses between a cathode and an anode in the laser system, including the steps of:

periodically measuring the voltage pulses between the anode and the cathode to determine whether such voltage pulses are producing at least a particular amount of energy, and if such periodic measurements indicate that the voltage pulses are not producing at least the minimum amount of energy, sequentially and periodically measuring the thyratron voltage, the power supply voltage for the thyratron, the thyratron filament voltage, the trigger board voltage, the currents through the different portions of the thyratron, the current from the high voltage power supply and the thyratron current to determine which, if any, of the thyratron, the thyratron voltage supply, the thyratron filament voltage supply, the trigger board and the cable have to be replaced.

5. A method as set forth in claim 4, including the steps of indicating which, if any, of the thyratron power supply, the thyratron, the thyratron filament power supply, the trigger board and the cable from the thyratron power supply should be replaced as a result of the monitoring performed.

6. A method of monitoring the operation of a laser system including a laser with gas in the laser, low voltage power supplies, a high voltage power supply and a thyratron, including the steps of:

(1) measuring the energy from the laser to determine if such energy is below a first particular value, (2) if the energy from the laser is determined to be below the first particular value, measuring the voltages from the low voltage power supplies inn the laser to determine if such voltages are below second particular values and indicating that individual ones of such power supplies should be replaced if the measurements indicate that the voltages from these power supplies are below the second particular values, (3) measuring the voltage from the high voltage supply for generating pulses for triggering the thyratron controlling the operation of the laser to determine whether such voltage is below a third particular value and, if the measurement indicates that such voltage is below the third particular value, indicating that the high voltage power supply for providing such triggering pulses should be replaced, (4) measuring the high voltage power supply for the laser to determine if such measurement provides particular user-defined parameters and, if the measurement indicates that the high voltage power supply does not have such particular user-defined parameters, indicating that such high voltage power supply should be replaced, and (5) determining whether a first particular user-defined amount of gas exists in the laser by measuring gas depletion as a function of energy and, if such determination indicates that such first particular user-defined amount of gas does not exist in the laser, indicating that such gas should be introduced into the laser until such gas reaches at least a second particular user-defined amount greater than the first particular user-defined amount.

7. A method as set forth in claim 6 wherein a trigger circuit board is provided for triggering the thyratron and wherein a measurement is made to determine whether the voltage for generating the pulses for triggering the thyratron is below particular specified reference limits and wherein an indication is provided that the trigger circuit board should be replaced when the measurement indicates that the voltage for generating the pulses for triggering the thyratron is below the particular specified reference limits.

8. A method as set forth in claim 6 wherein the voltage across the high voltage power supply and the current through the high voltage power supply are measured to determine if the power supply has the particular user-defined parameters and, if such measurement indicates that the power supply does not have the particular user-defined parameters, providing an indication that the power supply should be replaced.

9. A method as set forth in claim 8 wherein a trigger circuit board is provided for generating the pulses for triggering the thyratron and wherein a measurement is made to determine whether the voltage for generating the pulses for triggering the thyratron is below a predetermined range and wherein an indication is provided that the trigger circuit board should be replaced when the measurement indicates that the voltage for generating such pulses is below such predetermined range.

10. A method as set forth in claim 8 wherein determining if the thyratron is pre-firing by measuring said system for a voltage drop and, if the measurement indicates that the thyratron is pre-firing, indicating that the thyratron should be replaced.

11. A method as set forth in claim 8 wherein a cable is provided for introducing the voltage to the thyratron and wherein a measurement is made to determine whether the voltage for generating the pulses for triggering the thyratron is below particular limits and wherein an indication is provided that the cable should be replaced when the measurement indicates that current flows through the high voltage power supply and that a voltage less than the third particular value is produced across the high voltage power supply.

12. A method as set forth in claim 6 wherein the firings of the laser are counted after the laser has been filled with the gas to at least the first particular amount and an indication is provided that the laser should be refilled with the gas to at least the second particular amount after a particular count of the firings of the laser.

13. A method as set forth in claim 6 wherein the laser has a resonator and optical elements and wherein the number of firings of the laser is counted after the resonator and optical elements have been replaced and wherein indications are provided that the resonator and the optical elements should be replaced after a particular count of the number of firings of the laser.

14. A system for monitoring the operation of a laser system including a laser with gas in the laser, low voltage power supplies, a high voltage power supply and a thyratron, including:

a first energy detector for measuring the energy from the laser, a data processor coupled to said first energy detector, wherein said data processor determines whether said measured laser energy is below a first particular value, said first particular value stored in a storage device coupled to said data processor, a first voltage measuring device for measuring the voltages from the low voltage power supplies in the laser, wherein said data processor determines whether the voltages are outside a second particular range of values stored in said storage design, a second voltage measuring device for measuring the voltage for triggering the thyratron, wherein said data processor determines if such voltage is below a third particular value stored in said storage device, a diagnostic device for measuring the voltage from the high voltage power supply, wherein said data processor determines if the high voltage power supply is providing a voltage within a particular voltage range stored in said storage device, and a gas concentration measuring device for measuring the amount of the gas in the laser, wherein said data processor determines if the amount of the gas in the laser is below a fourth particular value stored in said storage device.

15. A system as set forth in claim 14 wherein the said diagnostic device measures the current through the high voltage power supply and the voltage across the high voltage power supply, and wherein said data processor determines if the high voltage power supply is operating properly.

16. A system as set forth in claim 14 wherein said gas concentration measuring device counts the number of firings of the laser after the last filling of the laser with the gas to determine if the amount of the gas in the laser is below the fourth particular value.

17. A system as set forth in claim 14, including, means for measuring the firing characteristics of the laser, wherein said data processor determines if the laser pre-fires before the voltage from the thyratron reaches a fifth particular value stored in said storage device.

18. A system as set forth in claim 14 wherein
the laser has a resonator and optical elements and wherein said system is further comprised of a counter for counting the number of firings of the laser after the last replacement of the resonator and the optical elements, wherein said data processor determines if the resonator and the optical elements should again be replaced.

* * * * *